(12) United States Patent
Chesnais et al.

(10) Patent No.: US 7,272,662 B2
(45) Date of Patent: Sep. 18, 2007

(54) SYSTEMS AND METHODS FOR ROUTING MESSAGES TO COMMUNICATIONS DEVICES OVER A COMMUNICATIONS NETWORK

(75) Inventors: Pascal Chesnais, Cambridge, MA (US); Christopher Herot, Newton Highlands, MA (US); Imran Qidwai, Westborough, MA (US); Joshua Randall, Longmeadow, MA (US); Kamal Ayad, Medford, MA (US); John Ciarlante, Shrewsbury, MA (US)

(73) Assignee: NMS Communications Corporation, Framingham, MA (US)

( * ) Notice: Subject to any disclaimer, the term of this patent is extended or adjusted under 35 U.S.C. 154(b) by 798 days.

(21) Appl. No.: 09/997,884

(22) Filed: Nov. 30, 2001

(65) Prior Publication Data

US 2002/0087704 A1   Jul. 4, 2002

Related U.S. Application Data

(60) Provisional application No. 60/282,429, filed on Apr. 9, 2001, provisional application No. 60/250,384, filed on Nov. 30, 2000.

(51) Int. Cl.
*G06F 15/16* (2006.01)
(52) U.S. Cl. .................. 709/246; 709/230; 709/238
(58) Field of Classification Search ........... 709/203, 709/217, 230, 236, 238, 246
See application file for complete search history.

(56) References Cited

U.S. PATENT DOCUMENTS 5,493,692 A   2/1996   Theimer et al. ........... 455/26.1

(Continued)

FOREIGN PATENT DOCUMENTS

WO   WO96/09710   3/1996

(Continued)

OTHER PUBLICATIONS

Dana Spiegel; "Canard Documentation Center", in /canard/Hypermail/Canard, May 1999.

(Continued)

*Primary Examiner*—Saleh Najjar
*Assistant Examiner*—Faruk Hamza
(74) *Attorney, Agent, or Firm*—Chapin IP Law, LLC; Barry W. Chapin, Esq.

(57) ABSTRACT

The present disclosure is directed to systems and methods for routing a message to a communications device. These systems and methods may receive a message via a communications channel, convert the message into a uniform media format, identify at least one of the following: at least one user communications device to receive the message and at least one communications channel for delivering the message, then convert the uniform media formatted message for at least one communications protocol and then forward the message formatted for the at least one communications protocol to the at least one user communications device via at least one communications channel. In accordance with the systems and methods disclosed herein, messages sent in one communications protocol via a communications channel may be delivered to a user in a different communications protocol via a different communications channel. The message may be forward to a user's communications device based upon the user's contact profile and location information and the user's preferences information. In some embodiments, the message may be delivered via an instant messaging communications channel.

83 Claims, 9 Drawing Sheets

U.S. PATENT DOCUMENTS

| | | | | |
|---|---|---|---|---|
| 6,031,895 | A | * | 2/2000 | Cohn et al. .............. 379/88.13 |
| 6,085,203 | A | * | 7/2000 | Ahlers et al. ................ 715/523 |
| 6,101,320 | A | | 8/2000 | Schuetze et al. ....... 395/200.36 |
| 6,405,254 | B1 | * | 6/2002 | Hadland ..................... 709/230 |
| 6,442,589 | B1 | * | 8/2002 | Takahashi et al. .......... 709/203 |
| 6,487,278 | B1 | * | 11/2002 | Skladman et al. ....... 379/88.13 |
| 6,549,937 | B1 | * | 4/2003 | Auerbach et al. ........... 709/206 |
| 6,564,264 | B1 | * | 5/2003 | Creswell et al. ............ 709/245 |
| 6,643,709 | B1 | * | 11/2003 | Kwon ......................... 709/246 |
| 6,650,739 | B1 | * | 11/2003 | Doeberl et al. .......... 379/88.18 |
| 6,757,731 | B1 | * | 6/2004 | Barnes et al. ................ 709/227 |
| 6,782,415 | B1 | * | 8/2004 | Quine ......................... 709/206 |
| 6,785,730 | B1 | * | 8/2004 | Taylor ........................ 709/230 |
| 6,826,597 | B1 | * | 11/2004 | Lonnroth et al. ........... 709/207 |
| 6,857,008 | B1 | * | 2/2005 | Shenefiel .................... 709/219 |
| 6,938,087 | B1 | * | 8/2005 | Abu-Samaha ............... 709/227 |

FOREIGN PATENT DOCUMENTS

WO     WO 00/49819     8/2000

OTHER PUBLICATIONS

Pascal Chesnais; "URL: http://canard.media.mit.edu" went on line on Nov. 15, 1996.

Pascal Chesnais; "E-Mail Extension to the Canard Community Messaging System" Issued on Feb. 3, 1997.

Application for Approval to Use Humans as Experimental Subjects No. 2334; Originally Submitted by the Massachusetts Institute of Technology on Aug. 13, 1996 and Revised on Nov. 8, 1996.

Pascal Chesnais, "Canard Messaging System", Slides used at talk given to Motorola International Network Division on Mar. 12, 1997, Schaumburg, Ill.

Pascal Chesnais, "Canard Object Definitions", Last Updated on Apr. 30, 1997.

Pascal Chesnais; "Canard Overview: Community Messaging System for Group Collaboration", Last Revised on Nov. 8, 1996.

Pascal Chenais; "LibMessage- messaging via email", lacsap@good-humor.media.mit.edu, Aug. 5, 1996.

Dana Spiegel; "Email as an Object-to-think-with", danas@mit.edu, Dec. 12, 1996.

Pascal Chesnais; "Canard: A Framework for Community Messaging", lacsap@media.mit.edu, Apr. 7, 1997.

International Search Report Completed on Oct. 8, 2002 and Mailed on Oct. 15, 2002.

* cited by examiner

Process flow when a reply enters a VirtualSession

SYSTEMS AND METHODS FOR ROUTING MESSAGES TO COMMUNICATIONS DEVICES OVER A COMMUNICATIONS NETWORK

CROSS-REFERENCE TO RELATED APPLICATIONS

This application claims priority to U.S. Provisional Patent Applications No. 60/250,384, filed 30 Nov. 2000, and No. 60/282,429, filed 9 Apr. 2001, the contents of which are herein incorporated by reference in their entireties.

BACKGROUND

With the explosion of the information ago that has occurred over the past decade, consumers have been inundated with the availability of many new and different communications devices that can send and receive messages. In today's world, it is not uncommon for a single consumer to have a home email address, a work email address, a mobile phone, an instant messaging service, a mobile phone, a PDA etc, etc. With all these communications devices being capable of receiving messages, ensuring that a consumer has physically received all of her messages in a timely fashion can involve a great deal of effort on the consumer's part. Complicating the problem is the fact that many (if not most) of the communications devices which are available to consumers today are not compatible with each since most of these communications devices handle their messages in different communications protocols.

SUMMARY

The systems and methods described herein can provide a context-sensitive messaging solution: a flexible, real-time hardware or software messaging switch that can connect multiple voice and data communications devices over both wired and wireless networks.

The systems and methods described herein can use delivery decisions stored as Contact Profiles to filter, format and route notifications and messages (i.e., herein collectively referred to as "messages") to recipients' communications devices via communications channels. These delivery decisions can be based on sender or subscriber preferences, calendar settings, address books, location information, etc. Using a format known as UMF (Uniform Media Format), the messaging systems discussed herein can bridge the gaps between different message formats and devices.

The present disclosure is directed to messaging systems and messaging methods for routing a message to a communications device. In certain exemplary embodiments, a messaging system may include at least one receiving transport agent to receive a message via a communications channel and convert the message into a uniform media format, at least one core messaging module which identifies at least one of the following: at least one user communications device to receive the message and at least one communications channel for delivering the message, and at least one delivery transport agent to convert the uniform media formatted message for at least one communications protocol and forwarding the message formatted for said at least one communications protocol to the at least one user communications device via at least one communications channel. In some embodiments, the receiving transport agent(s), core messaging module(s) and delivery transport agent(s) may reside on a network server or a plurality of network servers.

In some exemplary embodiments, the delivery transport agent(s) can include a carrier management module. The carrier management module may include a carrier knowledge database.

In certain exemplary embodiments, a messaging system may also include a load balancing module to manage message handling within the system.

In certain other exemplary embodiments, the core messaging module(s) can include a user manager module and a message manager module. The message manager may consult with the user manager module to identify the communications device(s) to receive the message and/or the communications channel(s) for delivering the message. A messaging system may further include a contact profile and location database containing contact profile and location information and/or a user preferences database containing user preferences information. The user manager module may be able to access this information.

In some exemplary embodiments, a user interface having controls may be provided to allow users to access the contact profile and location database and/or the user preferences database. Optionally, an application program interface gateway may also be provided which may allow an application to access the contact profile and location database and/or user preferences database.

In other exemplary embodiments, a messaging system may also include a message tracker module having a message tracker database. Some embodiments may also include a recovery agent module which may monitor the message tracking information to detect message delivery errors. The recovery agent module may notify the core messaging module of any message delivery errors.

In yet another exemplary embodiment, a messaging system may include an instant messaging delivery transport agent having a virtual session object which can establish an instant messaging session between a sender and a recipient. In some embodiments, the instant messaging delivery transport agent may also include a message distributor module and a message map module. In yet other embodiments, the instant messaging delivery transport agent may further include a reply handler module.

In an exemplary embodiment, a method for routing a message to a communications device, may include receiving a message via a communications channel, converting the message into a uniform media format, identifying a communications device(s) to receive the message and/or a communications channel(s) for delivering the message, converting the uniform media formatted message for the communications protocol and then forwarding the message formatted for the communications protocol(s) to the communications device(s) via the communications channel(s). The uniform media format may be implemented in the extensible markup language.

In certain exemplary embodiments, the method may also include maintaining a copy of the uniform media formatted message within a database, determining whether the message formatted for a first communications protocol has been delivered via a first communications channel, retrieving the copy of the uniform media formatted message from the database, identifying a second communications device to receive the message and/or a second communications channel for delivering the message, converting the uniform media formatted message for a second communications protocol, and then forwarding the message formatted for the second communications protocol via the second communications channel.

In some exemplary embodiments, the method may also include the step of maintaining a virtual session between a sender and a recipient when the uniform media formatted message is converted for an instant messaging communications protocol is forwarded to a recipient via an instant messaging communications channel.

Further features and advantages of the systems and methods disclosed herein will become apparent from the following description of the preferred embodiments and from the claims.

DEFINITIONS

A "Subscriber" has an account and a contact Profile through which they receive messages.

A "Non-subscriber" is someone to whom a message has been sent, but an account is not created, and no information about the recipient can be accessed through the system except for the purposes of message tracking.

A "Profile" contains the delivery information required to send (e.g., rout) messages intelligently, such as the identity of the communication channel and the communications device to which an incoming (i.e., received) message should be sent. At any given time, only one Profile can be active. All messages sent to a subscriber are delivered on the Channel(s) linked to the currently Active Profile.

The term "communications channel" refers to the delivery path that may be used to send or receive a message. Communications channels may include, but are not limited to: email (SMTP), WAP, HDML and/or WML for wireless digital phones, instant messaging, Short Messaging Service for mobile phones and pagers, fax, SIP, a receiver application program interface, a web-browser enabled channel, etc.

The term "communications device" simply refers to the physical device that a sender or a recipient may use to send or receive a message. Thus, a "communications device" can be a mobile phone, a laptop computer, a desktop computer, a personal digital assistant, a pager, a fax machine or a wide variety of other devices that may be capable of receiving messages via a communications channel. Some communications devices can receive messages via multiple communications channels. For example, a laptop computer may be able to receive (and send) messages via an ICQ ("I Seek You") communications channel and an email communications channel.

DETAILED DESCRIPTION OF EXEMPLARY EMBODIMENTS

The systems and methods described herein can provide messaging solutions for the carrier and enterprise markets. By utilizing the systems and methods described herein, messages may be sent to any communications device that a user (i.e., a recipient of a message) may chooses irrespective of the communications device (or communications channel) in which the sender may have intended the message to be delivered to. By allowing a user the freedom to use whichever communications device is most practical or convenient during any particular moment of time or location, rather than having to monitor a jumble of different communications devices, the systems and methods described herein can help ensure that a user receives his or her messages in a more timely fashion and/or in a manner and time of the user's choosing.

Figure 1:
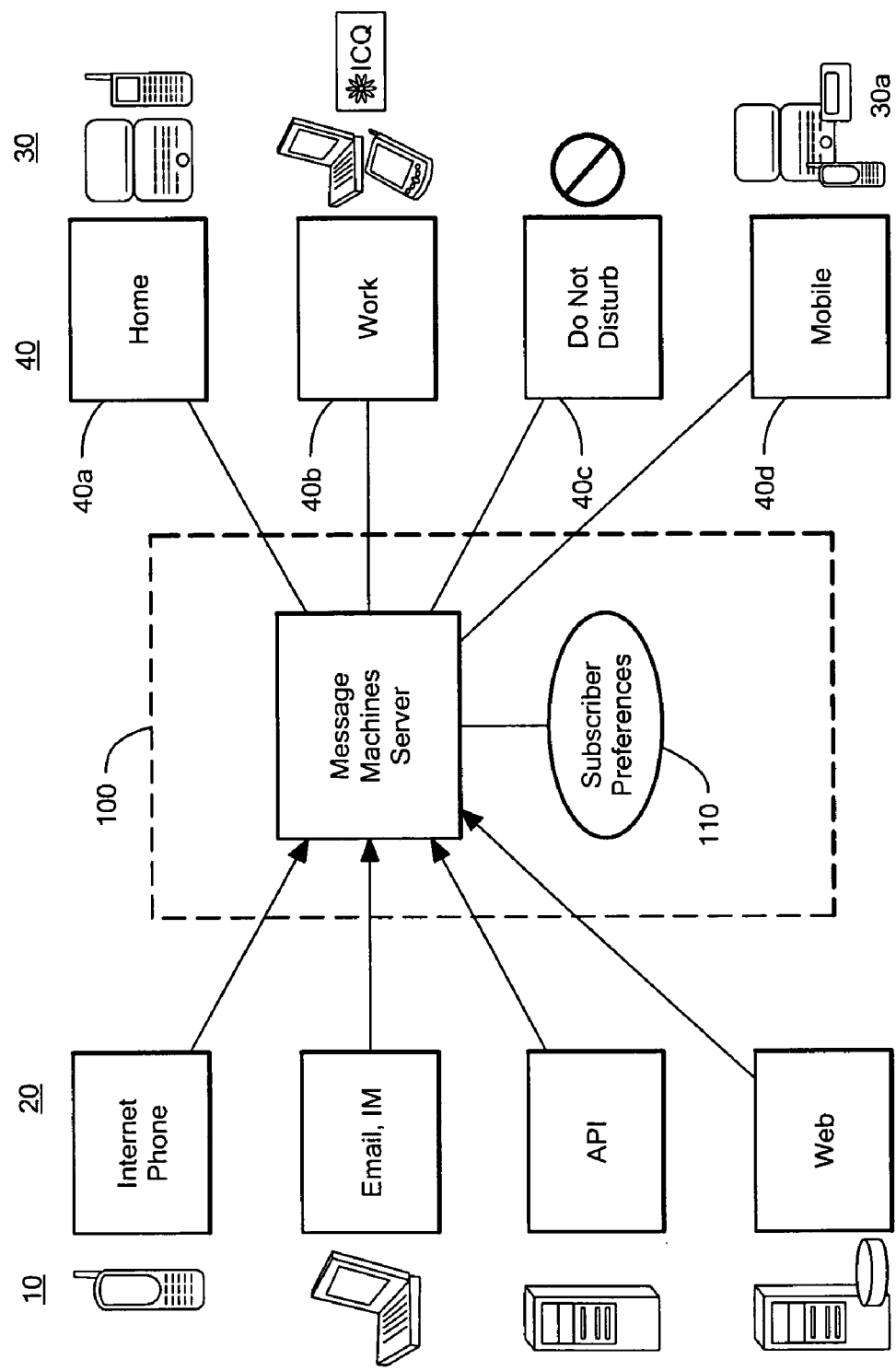
FIG. 1 illustrates one embodiment of a messaging system for routing a message to a communications device.
Figure 2:
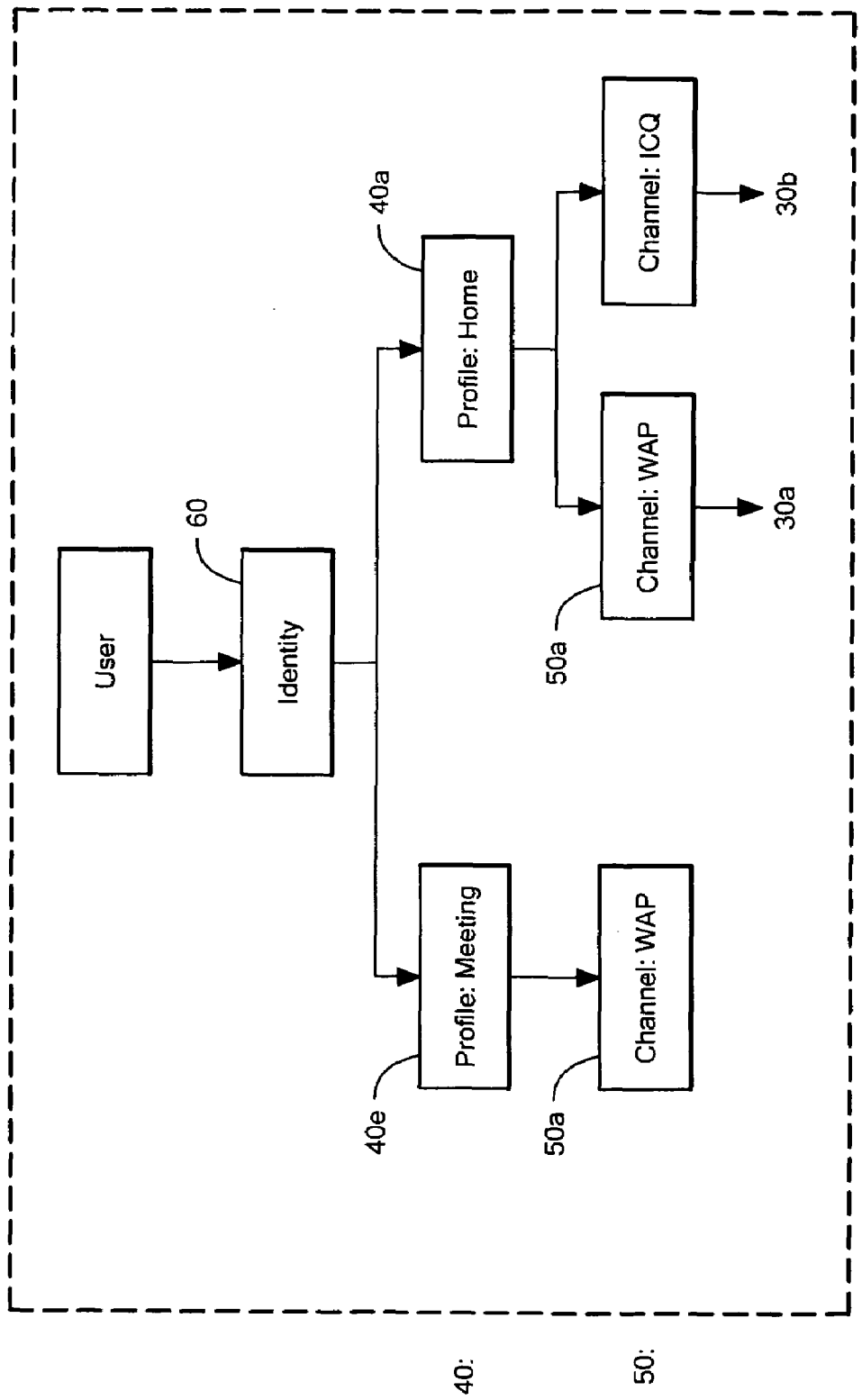
FIG. 2 illustrates one embodiment of a profile arrangement.

Referring to FIGS. 1 and 2, in the exemplary embodiment illustrated in FIG. 1, a messaging system 100 may receive messages generated from many different sender communications devices 10 via a plurality of communications channels 20 and send the messages to the user's communications devices 30 (via communications channels) as may be dictated by a user's preferences, schedule and location information etc., that may be stored in a database 110 (or a plurality of databases). This information (or a portion of it) may be arranged in the form of contact profiles 40 (sometimes simply referred to as profiles). A contact profile 40 may list the communication devices 30 that may be available for a particular user, e.g., a message recipient. Moreover, a user's contact profile 40 may be arranged so as to further specify those communication devices 30 which are available to receive messages during the user's real time status or availability, or, in some embodiments, those communications devices 30 which are available in a given location. [Location, as that term is used herein, may include a user's physical geographical location (i.e., where they are physically located) and a user's communications device "location," meaning the communications device 30 which the user may be currently (or recently) using.] For instance, a particular user's contact profile 40 may identify the user's communication devices which are available to receive messages while the user is at work, at home, or on vacation, etc. For example, a "Home" contact profile 40a could list the devices available when the user is at home. Furthermore, each communication device 30 may have one or more communication protocols (which a communications channel(s) could support) for which it can receive messages on. A digital cellular phone, for example, may be able to receive short messages with the Short Message Service (SMS) protocol, as well as, receive messages with WAP alerts. The various contact profiles 40 corresponding to a particular user may be created by soliciting the user's schedule, rules, location and/or preferences information. The users' schedules, profiles, rules, location and preferences may be contained within a database 110 (or, as will be seen later, a user preferences database 276). A user's schedule information can be a calendar-like arrangement of her schedule: from 9 am-5 pm on days x, user will be at "work", etc.

To illustrate, if a user (e.g., subscriber) is traveling during a period of time and wishes to receive her messages on her mobile telephone during this period, the user may establish a mobile profile 40d that contains the mobile telephone 30. Similarly, if a user does not want to receive any messages during some period of time, the user may establish a "do not disturb" profile 40c, in which case, any messages received during this period of time may be placed in a queue for later delivery (e.g., sent when the period set by the "do not disturb" profile 40b ends) and/or placed in message storage database where the user may manually retrieve these messages.

In some embodiments of the systems and methods described herein, a user interface may be provided to allow a user to change her presently active profile and/or input information into the database 110. For example, a user's current contact profile 40 can be set manually by the user (via the interface), or alternatively, automatically by consulting the database 110 (or user preferences database 276). Manually, for example, the user may have a "Do Not Disturb" profile 40c set, which may limits the messages the user may receive while this profile is active. If the salient features of an message entering the message system 100 match a criteria in the database 110 (for that user), the message can be immediately sent to the user, otherwise the message may either be put on hold (queued for later delivery) or sent to a message archive (e.g., a message storage database).

Referring to FIG. 2, in some embodiments of the methods and systems described herein a subscriber may be assigned a unique identity 60 which may have certain profiles 40 associated with it. For example, a "meeting" profile 40e and a "home" profile 40a may be associated with a particular identity 60. Each profile 40 can have one or more communication channels 50 associated with it, and the communications channels 50 may be associated with and used by more than one Profile 40. A subscriber can designate those communications channels 50 (and/or communications devices 30) which she wishes to have associated with a particular profile 40. In other words, a subscriber can identify the communications means (i.e., communication channels) by which she would like to receive her messages during an availability status designated by a particular profile 40, e.g., during a subscriber's active (i.e., the profile 40 which correlates with the current time and date) "work" profile 40b schedule all messages should be sent via an email communications channel 50 to an email account X. In FIG. 2, for example, the "meeting" profile 40e has a WAP communications channel 50a associated with it while the "home" profile 40a has both a WAP communications channel 50a and a ICQ communications channel 50b associated with it. As can be seen in FIG. 2, the WAP communications channel 50a correlates with a user mobile phone communications device 30 and the ICQ communications channel 50b correlates with a computer communications device 30 which can support the ICQ communications channel 50b. Each communication channel 50 thus represents a separate delivery method that can used to send a message (that is properly formatted for that communications channel 50) to a recipient's communications device 30.

In addition to the profiles 40 discussed above, which may be structured around a user's schedule (e.g., user is at "work" during X, "mobile" during Y and at "home" during Z, etc.), a user's messaging preferences may also be arranged around a user's location. Therefore, in some embodiments a user may be able to specify that while the user is within some defined physical location boundaries messages should be delivered via a certain (or a plurality of) communications channel 50. In some embodiments, system 100 may be aware of the user's physical location and thus profiles could be generated based upon this location information (instead of based upon some availability status such as "work" or "home"). The incorporation of location functionalities (for 911 purposes) into the wireless communications carrier systems may be one example of how a messaging system (like system 100) could ascertain where a user is presently located. In addition to a user's physical location, in some embodiments, the system 100 may be capable of monitoring a user's presence within the network in which the system 100 is connected to. For example, if a user logs onto his Internet Account (hosted by a service provider), the system 100 may be notified of the user's presence (i.e., a form of location) and this presence information may include identifying the actual communications device 30 that is currently be used by the user. Thus, location-based profiles may be established wherein a user's messages are to be delivered via those communications channels upon which the user is currently (or recently) present on.

In some embodiments, the subscriber preferences database 110 may contain both user profile and location information and user schedule information. The user profile and location information may contain the profile, location and communications channel information—which can include the communications channel information necessary to send a message on a given communications channel 50. The communications channel information may include, but is not limited to, a sender's name and communications device address, the communications channel type and acceptable communications protocols, carrier or service provider information, and the recipient's name and communications device address.

Message Handling

Figure 3:
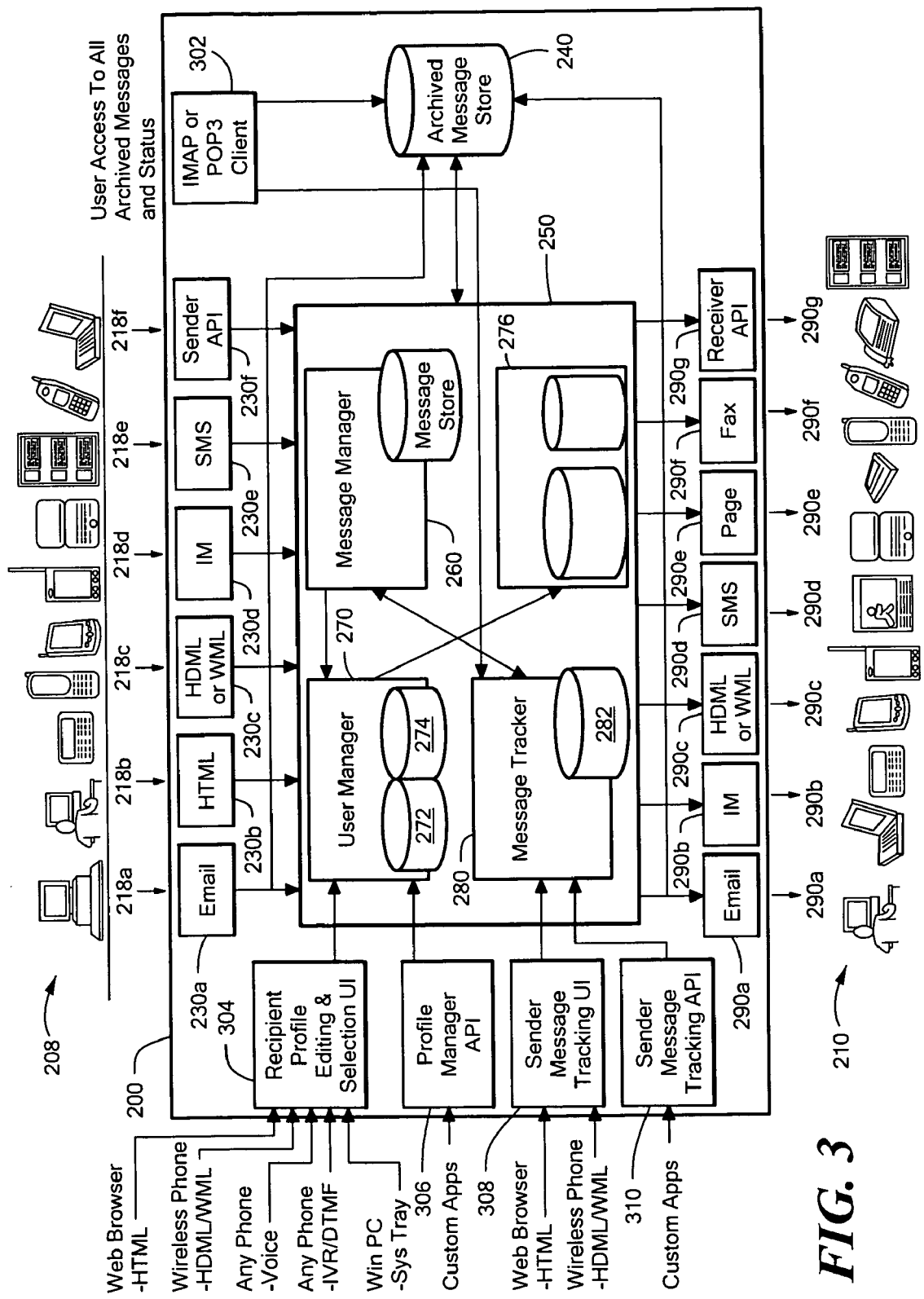
FIG. 3 illustrates another embodiment of a messaging system for routing a message to a communications device.

In the exemplary embodiment illustrated in FIG. 3, system 200 can send a message to a communications device 210 over a communications network in real time or in near-real time. In FIG. 3, messages generally flow from top to bottom and from a sender to a recipient. A message which is to be delivered to a recipient (e.g., a subscriber or a user) can be generated at a sender communications device 208. The system 200, which receives the message generated by the sender, is responsible for directing (i.e., sending) the message to at least one of the recipient's communications device 210. A message (or messages) may be delivered via the system 200 to the recipient within a variety of communication protocols that may be delivered over a variety of communication channels 220. Amongst others, system 200 may be capable of sending messages formatted in the following communication protocols: SMTP, HTML, XML, HDML, WML, VXML, SNPP, SMPP, SIP, SIMPLE, SMDI, Instant Messaging (e.g., AOL IM protocol, Yahoo IM protocol, Jabber IM protocol, Microsoft Messenger, etc.), wireless telephone Short Messaging Service (using SMPP and SNPP, for example) and a Sender Application Program Interface using http and socket protocols. Moreover, system 200 as illustrated may be capable of sending messages to communications devices 210 via an email communications channel 220a, an instant messaging communications channel 220b, an HDML/WML formatted communications channel 220c, a short messaging service (SMS) communications channel 220d, a paging service communications channel 220e and a fax service communications channel 220f. Additionally, system 200 can also send messages to communications devices 210 via a receiver application program interface communications channel 220g, which can be a wide variety of communications channels that may be used by an application to deliver messages to recipients. System 200 could also include a WAP communications channel, a SIP communications channel, and a web browser communications channel, amongst others.

Similarly, the system 200 can receive messages generated from sender communications devices 208 within a variety of communication protocols via a variety of communication channels 218. For example, system 200 as illustrated may be capable of receiving messages from communications devices 208 via an email communications channel 218*a*, an HTML communications channel 218*b*, an HDML/WML communications channel 218*c*, an instant messaging communications channel 218*d* and a SMS communications channel 218*e*. Furthermore, system 200 may also receive messages via a sender application program interface communications channel 218*f*, which can be a wide variety of communications channels that may be used by an application to send messages to a recipient. In other embodiments, systems for sending a message to a communications device may include a wireless application protocol communications channel and a web-browser communications channel, amongst others. Each communications channel 218 or 220 can handle messages formatted in a communications protocol(s) which is appropriate for that communications channel. An email communications channel 218*a* or 220*a*, for example, can be used as a pathway for messages which are formatted in a SMTP communications protocol, or any other communications protocol which may be utilized for formatting and delivering an email message.

A user, e.g., a subscriber, in association with his or her unique identifier 60, may have a number of identities that are native to the various communication protocols which may be monitored by the system 200. These "identities" may be a wide variety of signifiers that may correspond to particular user communications protocols and may include a user's email address, fax number, mobile telephone number, an instant messaging username, an IP address, for example. Receiving Transport Agents (RTAs) 230 may monitor the various communication protocols. A specific RTA 230 may handle incoming messages from a specific communications channel 218, e.g., email, HTML, Instant Messaging, etc. System 200 includes an email receiving transport agent 230*a*, an HTML receiving transport agent 230*b*, a HDML/WML receiving transport agent 230*c*, an Instant Messaging receiving transport agent 230*d*, a Short Messaging Service receiving transport agent 230*e* and a Sender Application Program Interface receiving transport agent 230*f*. A Sender Application Program Interface RTA 230*f* can be an RTA which is capable of receiving messaging from an external application (which is compliant with the an API of the system 200). A message delivered via the Sender Application Program Interface RTA 230*f* may dictate the communications channel 220 by which the message is to be delivered. Other RTAs which might be included in system 200 could include a page RTA, a fax RTA and a SIP RTA, amongst others.

The RTAs 230 may convert the received incoming messages into a Uniform Media Format (UMF), which can be a uniform representation for messages that preserves the features from source protocol and extracts salient features that can be used for analyzing the message (e.g., message destination, subject, priority, sender identity, etc.). Message representation in UMF may be implemented in a number of computer languages (e.g., C/C++, Perl, Java, etc.) and operating systems (e.g., UNIX, Windows server. Etc.) using the Extensible Markup Language (XML) or other platform-independent data formats.

Once a message has been received by a RTA 230 and converted to a desired UMF, the RTA 230 may then deliver the converted message to a Message Manager (MM) module 260 which may be located within a Core Messaging module 250. The Core Messaging module 250 of system 200 includes the MM module 260, a User Manager (UM) module 270, a Massage Tracker (MT) module 280 and a contact profile and location database 274. In some embodiments, the RTAs 230, Core Messaging module 250 and the Delivery Transport Agents (DTAs) 290 may reside on a single network server, while in other embodiments the RTAs 230, Core Messaging module 250 and the Delivery Transport Agents 290 may reside on a cluster of network servers. A wide variety of commercially available network server my be used to host the system 200. In some embodiments, single or multiple Sun SPARC servers (a UNIX operating system platform) may be utilized. In other embodiments, a Windows-based or Linux-based computer which is configured to act as a network server may be utilized. In one embodiment, a MM module 260 and a UM module 270 may be located on one network server while a MT module 280 may be located on another network server. Generally, however, due to the messaging processing requirements of the system 200, it may be advantageous to have the MM module 260 and a UM module 270 co-located on the same network server. Additionally, the contact profile and location database 274 may also reside on the network server(s) discussed herein, or alternatively, the contact profile and location database 274, like the other databases discussed herein, may exist separate from the network server(s). Persons skilled in the art will appreciate the various arrangements that may be configured to host and support the system 200.

The MM module 260 may be responsible for dispatching the message to the appropriate Delivery Transport Agent (DTA) 290 corresponding to the communications channel 220 that may be utilized to send the transmitted message to the recipient's communications device 210. To accomplish this the MM module 260 may determine the recipient's preferences (for receiving incoming messages) by consulting the User Manager (UM) module 270. The UM module 270 may have both a user directory database 272 and a contact profile and location database 274. The contact profile and location database 274 may contain contact profile information regarding the communications channels available for a particular user, i.e., recipient. Moreover, the contact profile and location database 274 may be arranged so as to further specify those communications devices, if appropriate (such as a user's mobile phone) which are available to receive messages during the user's real time status, availability or location. For instance, a particular user's contact profile and location information may identify the user's communications devices 210 that are available to receive messages while the user is at work, at home, or on vacation, etc (e.g., a "work" profile 40, a "home" profile 40, a "vacation" profile 40, a "while I'm in California" location profile, etc.). For example, a "home" profile 40 may list the communications devices 210 which may be available to the user when the user is at home. Furthermore, as previously discussed, each communications device 210 may have one or more communication protocols for which it can receive messages on: a digital cellular phone, for example, may be able to receive short messages with the Short Message Service (SMS) protocol, as well as, receive messages with Wireless Application Protocol (WAP) alerts. The contact profile and location information corresponding to a particular user may be created by soliciting the user's schedule, rules and or preferences information (collectively referred to a "user preferences information") which may be stored in the user preferences database 276. The UM module 270, thus, may access the user preferences information stored in the user preferences database 276 to determine how a specific message is to be handled (e.g., converted and sent) so as to deliver (i.e., send) the message to the user's communications device(s) 210. [System 200 may have an internal clock and calendar modules so that schedule preferences may be correlated with the present time and date.] While the user preferences database 276 of system 200 is shown as being a module which is separate from the UM module 270, in other embodiments the user preferences database 276 may reside within the UM module 270. Once the UM module 270 identifies the user's appropriate contact profile and location and preferences information, the UM module 270 may then instruct the MM module 260 of the user's current active profile 40 which can contain all the channel information (e.g., communications channel 220 and communications device 210 information) that may be needed to send the message on the appropriate communications channel 220.

Once the MM module 260 determines from the UM module 270 how the message is to be sent to the recipient, the uniform media formatted message can then be delivered to the appropriate Delivery Transport Agent (DTA) 290 that may be responsible for the identified communications channel 220. Different DTAs 290 may handle delivering messages to different communications channels 220, e.g., email, HTML, Instant Messaging, etc. System 200 as illustrated includes an email delivery transport agent 290a, an Instant Messaging delivery transport agent 290b, a HDML/WML delivery transport agent 290c, a Short Messaging Service delivery transport agent 290d, a page delivery transport agent 290e, a fax delivery transport agent 290f and a Receiver Application Program Interface delivery transport agent 290g. Other delivery transport agents, such as a web-browser or HTML delivery transport agent may be present, for example. Persons skilled in the art will recognize that any and all communication channels 220 (or 218) that may be available for sending messages may have a correspondingly appropriate delivery transport agent 290 (and receiving transport agent 230). The DTAs 290 can receive the message from the MM module 260 and convert the message from the UMF into a representation that is usable by the native communications protocol of the delivery communications channel 290, e.g., the identified communications channel 220 of the desired recipient communications device 210.

The system 200 of FIG. 3 also includes a message storage database 240 for storing messages. In some embodiments, the RTAs 230 may deliver a copy of a received message to the message storage database 240. In other embodiments, the RTAs 230 may deliver a copy of the uniform media formatted message to the message storage database 240, and in yet other embodiments the RTAs 230 may deliver both a copy of a received message and a copy of the uniform media formatted message to the message storage database 240. Similarly, in some embodiments, the DTAs 290 may deliver a copy of a communications protocol formatted message to the message storage database 240. The storage of messages (either in an as-received message format, a uniform media formatted message or as communications protocol formatted message) within a message storage database 240 may be advantageous in that it may allow for the recovery of a message upon the occurrence of a system failure or other anomaly and, additionally, it may allow a user (e.g., subscriber) to access his or her messages which may be stored in the message storage database 240.

The system 200 of FIG. 3 also includes a Message Tracker (MT) module 280 that has a message tracker database 282. Various modules of the system 200 can report message tracking information to the MT module 280. The MT module may store this message tracking information in the message tracker database 282. Message tracking information may include, but is not limited to, a module's (e.g., a RTA 230, a Core Messaging module 250 or a DTA 290, for example) the receipt of a message (e.g., the fact that a particular module has received a message for processing), a module's delivery of a message, and the destination of where a message has been delivered to, amongst others. In one embodiment, the RTAs 230, the Core Messaging module 250 (e.g., the MM module 260) and the DTAs 290 each may report messaging tracking information to the MT module 280.

In another embodiment, the DTAs 290 might report, to the MT module 280, messaging tracking information regarding the delivery of the message to the recipient's communications device 210. For example, as a message is being processed by the DTA 290, the DTA 290 may report message tracking information such as the delivery status of the message, to a Message Tracker (MT) module 280. The MT module 280, as discussed, may maintain this message tracking information in the message tracking database 282. In some cases, depending upon the communications channel 220 that is used, the message may be tracked to the destination communication device 210 and a delivery status confirmation message tracking information (e.g., such as a "read" confirmation, a "delivered" confirmation or a "fail to deliver message" confirmation, for example) may be determined and relayed back, via the RTA 290, to the MT module 280. In some cases, however, the delivery status confirmation message tracking information which may be available from a carrier (which may control a communications channel 220) may be limited and this fact may be noted in the tracking information sent to the MT module 280. If a DTA 290 fails to deliver a message to the intended communications device 210, this message tracking information may be noted in a data record which may be sent to the MT module 280.

The system 200 may further include a recovery agent module (not shown), which may be included in the MT module 280 or may exist as a separate module within the system 200. The recovery agent module may monitor the message tracking information stored in the message tracking database 282 to detect for the presence of any message delivery errors. Message delivery errors may be detected based upon an established time-out period which has elapsed between two consecutive modules (such as when a DTA 230 reports the handing-off of a message to a Core Messaging module 250 and the Core Messaging module 250 fails to report any messaging tracking information to the MT module 280 within a set period of time, for example) or, alternatively, may be based upon a delivery status confirmation message tracking information received from a DTA 290.

Upon the detection of a message delivery error, the recovery agent module may notify the MM module 260 of the delivery error. In one embodiment, the MM module 260 can then recover a copy of the uniform media formatted message (corresponding to the message that failed) from the message storage database 240 and initiate the determination of an alternate communications channel 220 (as discussed above) for delivering the message to the recipient or, alternatively, the MM module 260 may place the message in a queue for a later delivery.

Module Communications

The following sections will describe each of the following modules in more detail:

1. Receiving Transport Agents (RTA)
2. Authentication Manager (AM)
3. User Manager (UM)
4. Message Manager (MM)
5. Message Tracker
6. Delivery Transport Agents (DTA)

Each module will be described as follows:
   Input→Process (responsibility)→Output
   Each module may operate completely independent of each other and knows nothing about the inner workings of other modules. While the following descriptions describe how each of these modules may function internally and externally with each other, the following descriptions are not intended to be exclusive means by which these modules may operate. Persons skilled in the art will readily appreciate how the teachings of this disclosure may be applied to systems and methods which are similar but somewhat different than those which are discussed herein. Thus, the following descriptions are not intended to represent the exclusive forms (i.e., embodiments) that these modules may take.

1. Receiving Transport Agents

Input:
   Each type of RTA 230 can handle incoming messages from a specific communications channel 218. Thus, to support each new communications channel, as they become available, a new RTA 230 should be added to the system 200 to handle any messages received via this new communications channels.

Process:
   Depending on the RTA 230, there might be an InQueue 234 (an "in" queue) for receiving messages for the purpose of improving the RTA 230 throughput. Each RTA 230 may take messages out of its the InQueue 234 and do the following:
   Assign a "unique message identifier" ("UID") to the message. To ensure that each "unique message identifier" is in fact unique, each RTA 230 within the system 200 may utilize the same message identifier generating program (i.e., algorithm) (not shown) to determine the unique message identifier that is to be assigned to a particular message.
   Save a copy of the received message (with its unique message identifier) in the message storage database 240.
   Convert the received message to the UMF, which in some embodiments is accomplished in the following manner:
      Step 1a: the RTA 230 looks up the destination address (found within the received message) in the user directory database 272 (which may be located within the UM module 270) to ascertain the recipient's unique identifier 60. The RTA 230 may reject the message if the intended recipient of the message (i.e., the destination address) is not a valid system 200 user (meaning the recipient has not subscribed to the services being delivered via the system 200), or
      Step 1b: if the recipient is not a valid system 200 user, then the RTA 230 may then look up the sender's address in the user directory database 272 to ascertain whether the sender is a valid system 200 user.
      Step 2: Assuming that either the recipient or the sender is a valid system 200 user, a UMF data structure with the recipient and sender information for "to" and "from" addressing information may then be created.
      Step 3: Extract message to use as the UMF "body." This may be a plain text or multipart multimedia format similar to MIME. Place body in UMF.
      Step 4: Extract a message feature to use as the UMF "subject", place in UMF structure.
      Step 5: Extract any alerting information to use a UMF "alert," which may be visual and/or audible.
      Step 6: Extract any protocol specific information (such as RFC 822 headers, for example) and place them in the UMF "RTA" structure.
   Save a copy of the uniform media formatted message in the message storage database 240.

Output:
The RTA 230 may post the "UMF" message to a coreQ 252 (an "in" queue for the Core Message module 250) containing the required information for the Core Message module 250 so that the Core Message module 250 may determine how the message is to be sent to the recipient.

Output Communication with Other Modules:
Ask AM (Authentication Manager) for user Authentication where necessary/possible. For instance, an inbound email destination must be validated before the SMTP server can accept the message.
Optionally, the RTA 230 may notify the UM module 270 to pre-fetch and cache the message recipient's contact profile and location information and user preferences information.
Deliver message tracking information to the MT module 280.

Administrative Support:
Each message may be time-stamped upon the entry and exit of the RTA 230. In some embodiments this information may be provided to the MT module 280.
An Administrative module may monitor the handling times of a UM module 270 and request additional resources be provided if it is deemed to be necessary.

Figure 4:
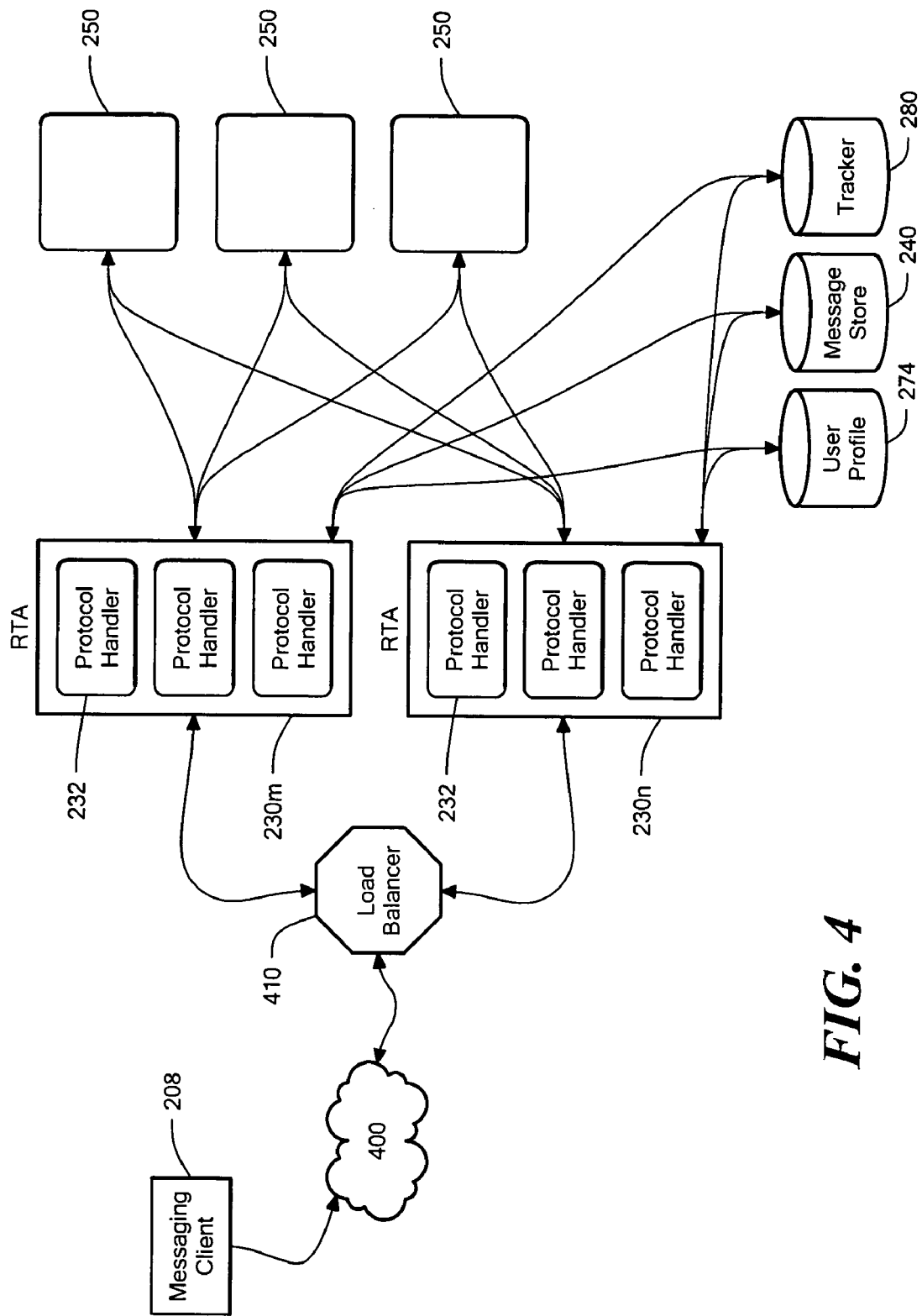
FIG. 4 illustrates a portion of one embodiment of a messaging system for routing a message to a communications device.

Other Considerations:
   There may be a unique RTA 230 for each communication channel 218 as a matter of scalability and distribution. However, the core design of an RTA, minus the specific protocol handler is common to all store and forward messaging protocol, with the exception of the IM RTA 230*d* (as is discussed below) which has intimate knowledge of the DTA side since it maintains the state of communications between two parties who are engaged in an instant messaging "dialogue."
   Referring now to FIG. 4, RTAs 230 may listen to a particular Internet protocol port (e.g., a communications channel 218). An external connection can be made from a communications network 400, such as the Internet, for example, either directly into the RTAs 230, or, as shown in FIG. 4, through a load balancing module 410 which is capable of routing communications (i.e., messages) to a plurality of RTAs 230. Thus, the load balancing module 410 may serve as a gateway for messages entering the system (such as a system 200, for example). As discussed above, each RTA 230 may only have one communications protocol-specific process running on it. In other words, for example, RTA 230*m* may be an email RTA having protocol handlers 232 which are designed (e.g., programmed) to handle the processing of incoming email messages while the RTA 230*n* may be an SMS RTA having protocol handlers 232 which are designed to handle the processing of incoming SMS messages. Thus, as depicted in FIG. 4, the load balancing module 410, in addition to acting as a gateway for the incoming messages, may also serve to route the communications protocol-specific messages to the appropriate communications protocol-specific RTA 230. In other embodiments, the load balancing module 410 may also serve to load balance the demands (e.g., allocate the resources) being placed upon a plurality of communications protocol-specific RTAs 230. For example, if the (partial) system depicted in FIG. 4 also included a plurality of email RTAs 230, the load balancing module 410 may also be responsible for deciding which email RTA 230 to forward an incoming email message to. This load balancing function of the load balancing module 410 may be accomplished by simply forwarding the communications protocol-specific messages to the appropriate communications protocol-specific RTAs 230 in a pre-established order (e.g., if there are five email RTAs 230 then the first email message might go to the first email RTA 230, the second email message goes to the second email RTA 230 . . . the sixth email message goes to the first email RTA 230, etc.) or alternatively, the load balancing module 410 may monitor the excess capacity that may exist within each of the RTA 230 and thus assign the incoming messages based upon the RTAs ability to handle additional capacity. Persons skilled in the art will recognize a wide variety of other approaches and methodologies, which can be adopted to facilitate this load balancing handling.

Within each module (e.g., RTAs 230, Core Messaging modules 250, DTAs 290, etc) are multiple handler threads (e.g., protocol handlers 232) which may allow for the efficient resource balancing within a system, e.g., system 200. This model of using load balancing and threading can allow for a highly scalable and efficient system architecture and methodology. Load balancing can be implemented as a Domain Name Service for some protocols such as SMTP or can happen in specialized hardware. On the Internet a client computer 208 can initiate a connection, this connection can be routed to one of the RTA processes. For example, an electronic mail agent sending a message would be routed to the email RTA 230 (handling SMTP formatted messages) which may be listening to TCP/IP port 25. This connection would be handed off in the RTA 230 to a specific thread which may do the rest of the processing required to dispatch the message to a Core Messing module 250 in the Uniform Media Format representation.

From a TCP/IP protocol point of view, each of the RTAs 230 can look like a native server for that protocol. That is to say, the email RTA 230 may respond exactly like any other RFC specified SMTP mail transport agent, etc.

The systems and methods presented herein are capable of receiving messages in a variety of forms, such as emails using SMTP or through an API, and delivering (i.e., sending) them in many different message formats (communications protocols) to a variety of communications devices. The "sent" outbound message types can include email, SMS, WAP alert, pager message, instant message, SIP/SIMPLE message, and alert to visual and audible notification devices, amongst others. The following is a brief description of how messages which are intend for a particular recipient may be directed to a server which hosts a messaging systems such as the one illustrated in FIG. 3. While this description will be limited to email messages only, persons skilled in the art will readily appreciate how these teachings can be extended to the other communication channels discussed herein.

When a user opens an account (i.e., becomes a subscriber) with a provider of the messaging systems described herein (hereinafter simply referred to as a "messaging system"), such as system 200, for example, the user may automatically get an email address that is directly associated ("linked") with the network server(s) that is hosting the messaging system. For messaging systems which are deployed by an enterprise or a service provider, email messages for a user may be routed (i.e., delivered) to the messaging system network server(s) in one or more of the following simple ways:

Provide a user with an email address that is directly associated with the network server(s) that is hosting the messaging system and publish this email address as the primary email address.

Point a mail domain to the network server(s) hosting the messaging system to set it up as the primary email server address Forward to network server(s) hosting the messaging system the email received or directed to another mail server Using the messaging system network server(s)' Email Address as the User's Primary Address:

The user may publish the email address that is directly associated with a messaging system (i.e., such as those described herein) to his or her contacts as the user's primary email address. [Thus, under this scenario the user may still have more than one active email accounts: the user's primary email address and other secondary email addresses.] When anyone else sends an email to the user's primary email address, the sending server will automatically deliver the message to the messaging system's network server(s) using the SMTP communications protocol. These steps can be done by the user, and does not require any action on the part of the mail system administrator.

Pointing a Mail Domain to Messaging System's Network Server(s):

The system administrator of a user's email account (i.e., address) can configure the IP network such that the mail domain name for the user's email addresses (such as a user's corporate email address, for example) points to the messaging system's network server(s). In such a case, the email is not copied to any other server functioning at the corporate email address. Such a configuration requires actions on the part of the system and network administrator controlling the user's email address.

Forwarding Email From Another Address to the Messaging System's Network Server(s):

The user's email account on another server (i.e., administered by a different email service) may be modified to automatically forward all incoming email to the messaging system's network server(s). This can be especially useful when the user wants to retain and publish a corporate email address, other than that of the messaging system (as presented herein), and all inbound email for the user arrives on the corporate email server first. Depending on the type of corporate email server in use, and the specific configuration, this may result in all inbound email being copied to both addresses or just to the messaging system. Except in the case of some web-based mail services, such a configuration change requires the intervention of the mail system administrator.

In order to forward external email to the messaging system's network server(s) using SMTP the following may have to be done (this assumes proper configuration of the DNS and the other Mail server):

1. The DNS (Domain Name Server) must be configured to allow mail forwarding to Messaging System's Network Server(s) SMTP handler by adding the Mail Exchanger record in the appropriate DNS Zone file. For example, company.com. MX 10 mmserver.company.com.

2. The Mail Server must be configured to forward the user's primary email to the Messaging System's Network Server(s). For example, on the UNIX Sendmail server the following entry may be added in the /etc/aliases file:
username: \username, "|sed s/^[\.]/../|formail-i \"Errors-to: username@company.com\"-ds /usr/lib/sendmail username@mmserver.company.com"

Notes:

username@company.com is the user email address on a corporate email server username@mmserver.company.com is the same user's messaging service email address.

2. Authentication Manager

Input:

Input to this module is a user name and password or email address or WAP phone info, etc.

Process:

Verify user is a registered user of the system (e.g., a subscriber) user by looking up user in the user directory database 272.

Verify security level for each message.

Output:

True or False about a particular user and security level for each message

3. User Manager

The User Manager module 270 can review the user's active profile 40 based on the user's user profile information stored in the contact profile and location database 274 and the user's user schedule information stored in the user preferences database 276 (e.g., user settings, preferences information, and any other information such as circles of trust and message archives etc.) The UM module 270 may then make a decision on where to send the message (i.e., via which communications channels 220 and which communications device 210, if appropriate). Note: the message may be sent via more than one communications channels 220 (e.g., simultaneously delivered on IM and email) if the user's active profile so dictates. In some embodiments, there can be three submodules found within the UM module 270:

1) a Profile Manager module which may be responsible for updating the user profile 40 and keeping cache system.
2) an Active Users module which may have a representation of each active user (e.g., users with messages in the system) and list of current messages and their state.
3) a Decision Maker module, which may be responsible for taking a decision about the destination of a certain message based upon user schedule information and user profile information.

[Note: In some embodiments, the Decision Maker module can be a part of the UM Module 270, as is discussed here. However, in other embodiments, the Decision Maker module can be a module within the Core Messaging module 250, and thus be separate from the UM module 270. Additionally, in some embodiments, the Decision Maker module may be responsible for a filtering function where the Decision Maker module may analyze a message for the detection of salient features, such as sender, destination, subject, etc. that a user may have indicated in the user's preferences information—the delivery or non-delivery of a message may be dependent upon these salient features.]

Input:

The input into the UM module 270 can consist of a message having the following:
UID
From
To
Content Type The messages inputted into the UM module 270 may be placed in a queue, e.g. UM InQ.

Process:

If an input queue is used, once the message is de-queued from the UM InQ, the Active User module can then be updated with this new message. Then the Decision Maker module may ask the Profile Manager module to lock the profile 40 from updates and get a recent profile 40.

Based on the profile 40 (and the user schedule information and user profile information), a decision regarding where the message should be sent can be made.

The UM module 270 can then update the message with the decision made about the DTA 290 which may be responsible for delivering the message via the determined communications channel 220.

Note: Users can change their profile using Web Browsers, phones, etc by calling the Profile Manager module to lock and update both cache (if cached).

The UM module 270 may maintain a Master table of all messages handled inside this module.

Output:

The UM module 270 may post the updated message to the MM module 260. In some embodiments, these updated messages may be placed into a MM module 260 "in" queue.

Deliver message tracking information to the MT module 280.

Administrative Support:

Each message handled by the UM module 270 may be time-stamped on the way in, and on the way out the time spent in the process may be calculated. In some embodiments this information may be provided to the MT module 280.

An Administrative module may monitor the handling times of a UM module 270 and request additional resources be provided if it is deemed to be necessary.

4. Message Manager

Input:

The MM module 260 may receive messages from the RTAs 230 and the UM module 270 as discussed above. Additionally, in some embodiments a MM module may also receive "failure to deliver" messages from DTAs 290 or, in other embodiments, from a recover agent module.

Process:

Based on the decision arrived at by the UM module 270 (e.g., the Decision Maker module), the MM module 260 may then pass the UMF message to the appropriate DTA 290. In some embodiments, the UMF message may be placed into a DTA "in" queue, such as a dtaQ 292, for example. Since more than one message may need to be delivered via communications channels 220, more than one UMF message may have to delivered to the DTAs 290.

When the MM module 260 receives a "failure to deliver" notification, as discussed above, the MM module 260 may ask the UM module 270 to determine an alternative communications 220 (and an alternative communications device 210, if appropriate), otherwise, the MM module 260 may place the failed message in a queue for a later delivering or place the failed message in a "failed delivery" Queue where it may be brought to the attention of a system administrator.

Update the Tracker.

Output:

Deliver the UMF message to the appropriate DTA(s) 290.

Administrative Support:

Each message handled by the MM module 260 may be time-stamped on the way in, and on the way out the time spent in the process may be calculated. In some embodiments this information may be provided to the MT module 280.

An Administrative module may monitor the handling times of a MM module 260 and request additional resources (e.g., request additional MM modules 260 be made available within the system) be provided if it is deemed to be necessary.

Message Policy:

The Message Manager module 260 can be responsible for maintaining the system's messaging policies (e.g., rules) as determined by the system administrator. Examples of a system's messaging policies can include, but are not limited to:

Message successfully delivered: does the system consider a message successfully delivered when it is read or delivered to the mailbox of the user?

Message failure: does the system have a partial failure when a DTA 290 fails to deliver a message (for example) and a full failure when the system has exhausted all its means of delivery?

When a message is sent from the MM module 260 to a DTA 290, it may have a "number of trails" the DTA 290 should attempt to deliver the message and an expiration time (if any) before it shall be considered a failure to deliver?

Will the MM module 260 ask the UM module 270 for an alternate route for the message (keeping in the message history that it failed on a particular DTA)? The UM module 270 may issue a new delivery order on another DTA with a number of trials and a new expiration time.

If the UM module 270 reached the level of no more delivery channels available, the MM module 260 may either defer the message for some period of time (e.g., place it in a queue) or send the message to a "full failure status" location.

A user can ask request that the messaging system hold (i.e., not deliver) their messages for some period of time and then deliver them all together.

5. Message Tracker

Input:

The MT module 280 may accept inputs (i.e., message tracking information) from all the other modules to update the message status. In some embodiments, the MT module 280 may also accept input queries from users via a User Interface or Message Tracking API.

Process:

The MT module 280 may update the message status (for a particular message) as soon as appropriate message tracking information is received from a module. The message status and message tracking information can be stored in the message tracker database 282.

The MT module 280 may answer the queries from users regarding the status of a particular message. Thus, the systems and methods described herein may have both internal and external status information. Internal status information may be used for system administrative purposes; while the external status information may be provided to a user or a sender in response to an outside user query.

Output:

The output will be a query response to a user request or administrative purposes.

6. Delivery Transport Agent

Input:

The DTAs 290 may receive input messages from the Core Messaging module 250 (e.g., the MM module 260) or from a dtaQ 292 if a DTA "in" queue is used.

The DTAs 290 may also retrieve messages stored in database, such as the message storage database 240, for example.

Process:

The DTA 290 converts the message into the desired communication protocol.

In some embodiments, there can be an internal Timer Queue within the DTAs 290 modules. Once a DTA 290 reads a message (from the MM module 260 of from the dtaQ 292, for example), the DTA 290 may check the desired delivery time of the message. If the current time is greater (i.e., after) the desired delivery time, then the message will be sent; otherwise the message may be placed in the Timer Queue.

If the message delivery fails, the DTA 290 may reschedule the time of delivery and put the message in the Timer Queue.

Output:

Forward the converted message via the communications channel 220

Provide message tracking information (as needed) to the MT module 280.

If messages reach "final failure" state, then the DTA 290 may send the message back to the Core Messaging module 250 (e.g., the MM module 260) for a determination of an alternative communications channel 220.

Administrative Support:

Each message handled by a DTA 290 may be time-stamped on the way in, and on the way out the time spent in the process may be calculated. In some embodiments this information may be provided to the MT module 280.

An Administrative module may monitor the handling times of a DTA 290 and request additional resources (e.g., request additional DTAs 290 be made available within the system) be provided if it is deemed to be necessary.

General Design DTA:

Each DTA 290 may receive message delivery parameter along with the UMF message. The DTA 290 may read messages from its own input queue, format (i.e., convert) them for delivery, and try to deliver the message. The DTA 290 may ascertain the desired delivery time and put the message in the Timer Queue. The Timer is a Queue which may be running in its own thread. Messages may be sorted in the Timer Queue by delivery time. The delayed delivery time may be governed by either a user specific parameter or by an appropriate message policy.

In certain embodiments, the systems and methods described herein may include system architectures and methodologies that utilize load balancing, modular implementations, input queues, message threading, and distributed resources (or various combinations thereof) to more efficiently manage and handle the routing of the messages. Load balancing within a messaging system may comprise managing the delivery of messages (i.e., message handling) within the various modules (e.g., RTAs 230, Core Messaging modules 250, DTAs 290, etc.) making up the system. Load balancing management may generally occur between the modules which are upstream and downstream from each (e.g., the hand off between a RTA 230 and a Core Messaging module 250). Modular implementation simply refers to the fact that additional modules within a system may be brought on-line (or taken off-line)—as the demands being placed upon a system may dictate—without causing any disruption to the system. Thus, additional modules may be added to handle the greater volume of messages and users as needed. The modules themselves can be stateless, which allows for the modules to be replicated across many machines (e.g., network servers or computers).

Input queues for the various modules may be utilized in certain embodiments so that upstream modules may pass on an input (i.e., the upstream module's output) to a downstream input queue (of the downstream module) without regard to whether the downstream module is presently available to handle that input. Thus, the presence of input queue may allow modules to "finish it and forget it"; the module accomplishes its task and delivers a message to the downstream input queue regardless of any bottlenecks that may be present in the system. This may allow for one module to place a message to be processed by another in the input queue and return quickly to handle more inbound messages. The various modules may also utilize threading techniques to handle the various messages which may be entering a particular module. Each module thus may be represented as a single process with multiple threads where each thread is assigned to handle a single message.

In certain embodiments, the messaging systems and methods may also share common resources, such as database access, load balancing functions and UMF conversion instructions (amongst others), for example. A distributed resources approach may permit modules to handle a larger number of messages since there may be less resource locking occurring with the system or method. The accessing (and managing) of these distributed resources may occur through abstraction layers. For example, the access to a database(s) may happen though a database abstraction layer (DAL) which allows for a database(s) to be distributed across multiple machines (e.g., network servers or computers) and different genres of database servers to be used.

Figure 5:
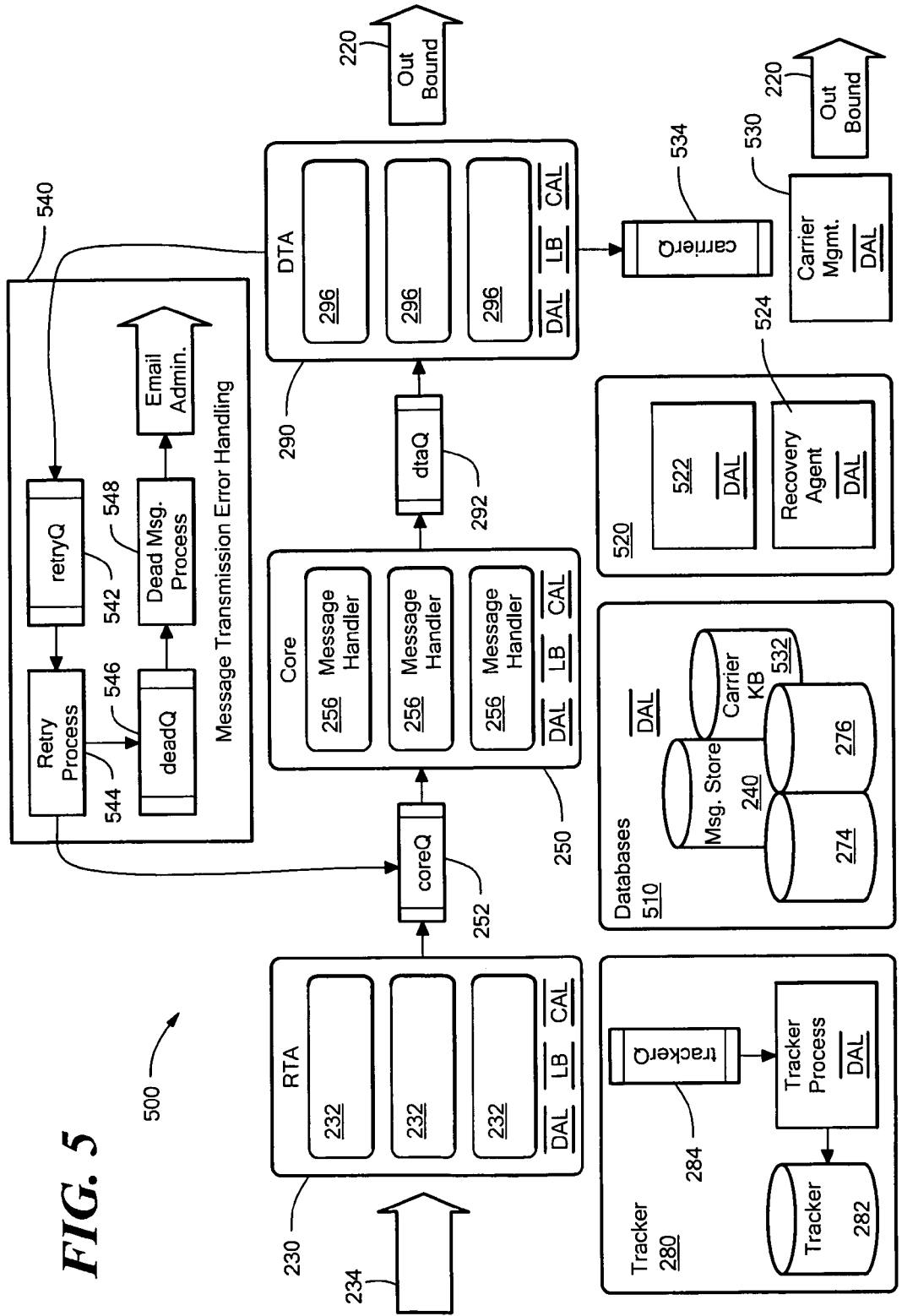
FIG. 5 illustrates yet another embodiment of a messaging system for routing a message to a communications device.

FIG. 5 illustrates a system 500 for routing a message to a communications device which includes a RTA 230, Core Messaging module 250, DTA 290 and a MT module 280. The RTA 230 of system 500 has an inbound message queue, "inboundQ" 234, where messages received via a communications channel 218 may be placed to await processing by the RTA 230. The Core Messaging module 250 has a core messaging queue, coreQ 252, where message handling requests received (i.e., delivered) from the RTA 230 (or MTEH module 540) may be placed to await processing by the Core Messaging module 250. Similarly, DTA 290 has a delivery messaging queue, dtaQ 292, where message delivery requests received from the Core Messaging module 250 may be placed to await processing by the DTA 290. The RTA 230 of system 500 is designed to handle several messages simultaneously through the use of threading programming methodologies. Specifically, RTA 230 as illustrates includes three protocol handlers 232; a protocol handler 232 is a thread, which is to say its a subprocess within a process. A threading approach is a modem programming technique which may allow a module (e.g., RTAs 230, Core Messaging modules 250, DTAs 290, etc.) to spend its time more efficient; one thread (i.e., a protocol handler 232) may be accessing a database resources, while another is using a load balancing resource, and yet while another is in the process of converting a message, etc. Thus, each protocol handler 232 may accomplish all the processing requirements of the RTA 230. The RTA 230 (like the other modules) is not limited to just the three protocol handlers 232 as shown; the RTA 230 (like the other modules) may be configured to have as many protocol handlers 232 as may be needed. For example, an email RTA 230a may be configured to have up to 15 threads (i.e., protocol handlers 232), which may allow the email RTA 230a to juggle messages from 15 different network sites at the same time.

Similarly, the Core Messaging module 250 as illustrated has three "threads", message handlers 256, within it. The message handling requests residing in the coreQ 252 may be distributed (i.e., directed) to the message handlers 256 as a message handler 256 becomes available. Additionally, the DTA 290 also has three "threads", protocol handlers 296, within it. The message delivery requests residing in the dtaQ 292 may be distributed to the protocol handlers 296 as the protocol handlers become available.

The MT module 280 has a message tracker database 282. The RTA 230, Core Messaging module 250, and/or DTA 290 may report message tracking information to the MT module 280 (via the DAL, as discussed below). The MT module 280 may maintain the message tracking information in the message tracker database 282. The MT module 280 may also include an input queue, trackerQ 284, where the message tracking information from the modules may be placed to await processing by the MT module 280.

System 500 also includes a Database module 510, an Administrative module 520, a Carrier Management module 530 and a Message Transmission Error Handling (MTEH) module 540. The Database module 510 includes a message storage database 240, a contact profile and location database 274, a user preferences database 276 and a carrier knowledge database 532. The Administrative module 520 includes a Conversion module 522, a Recovery Agent module 524 and a Load Balancing module (not shown). The Administrative module 520 and the Database module 510 of the system 500 can be distributed resources which the other modules may access via abstraction layers as required. Thus, for example, the RTA 230 may access any of the databases of the Database module 510 by utilizing the Data Abstraction Layer (DAL). The DAL may also be used by the modules to access the message tracker database 282 of the MT module 280. In other embodiments, other modules may act as distributed resources.

The Conversion module 522 may be responsible for the conversion processes which take place within the modules. The modules may access the Conversion module 522 through a Conversion Abstraction Layer (CAL). The Recovery Agent module 524 may monitor (via the DAL, for example) the message tracking information maintained by the MT module 280 to detect any message delivery errors. Upon the detection of a message delivery error, the Recovery Agent module 524 may notify the Core Messaging module 250 of the message delivery errors, wherein the Core Messaging module 250 initiates a redelivery attempt.

The Load Balancing module may responsible for controlling the message handling (e.g., distributing the received messages, message handling requests, message delivery requests, etc.) within the system 500. The modules within the system 500 may communicate with the Load Balancing module via a load balancing abstraction layer (LB). In some embodiments, the Load Balancing module may be responsible for determining which input message gets allocated to which (downstream) thread. The Load Balancing module can be a stub function, so an active mechanism of interfacing to the administrative component of the system 500 can be constructed. The load balancing methodology can be simplistic, meaning that it rotates messages between available queues and/or threads. However, persons skilled in the art will understand that the methodology of Load Balancing module can be quite complicated and may involved the monitoring of modules throughputs and other measurement parameters.

Certain DTAs 290 may need to interface with a Carrier Management module 530. The system 500 of FIG. 5 illustrates a system which has a Carrier Management module 530 separate from the DTA 290. In other embodiments, the Carrier Management module 530 may be sub-module of a DTA 290. Depending upon the communications channel 220 for which a DTA 290 is to be sending messages upon, the DTA 290 may need to communicate with a Carrier Management module 530. An example of this may be the IM DTA 290b (discussed below) which may have a virtual session object 290 for AOL, Yahoo, MSN, etc. (i.e., IM carriers). The DTA 290 needs to get the UMF message into a package that the carrier (e.g., communications channel host) will accept and, in some cases, take the results of passing the message to the recipient's message server and determining if it was successful or not. The DTA 290 may only know about the communications channel 220 and communications protocol which may be relevant to that DTA 290. To deliver the message, relevant information about the carrier (e.g., what specific transport protocol they use, for example, in the case of SMS it could be SMPP or SNPP or TAP etc. . . . ) may need to be ascertained. The Carrier Management module 530 may manage the carrier-specific information which may be necessary to deliver a message via the communications channel 220. This carrier-specific information (e.g., for all communications channels 220) may reside in a carrier knowledge database 532 which the Carrier Management module 530 may be able to access via the DAL. In some embodiments, however, the carrier knowledge database may reside within the Carrier Management module 530. The DTA 290 may deliver a carrier management request (e.g., a request for carrier information) to the Carrier Management module 530. In some embodiments, the Carrier Management module 530 may have a carrier management queue, carrierQ 534, where carrier management requests generated by the DTA 290 may be placed to await processing by the Carrier Management module 530. From the carrier-specific information, the message may be formatted so that it may be delivered on the communications channel 220. In some embodiments, the Carrier Management module 530 may be responsible for delivering the message via the communications channel 220. However, in other embodiments, the DTA 290 may retain final responsibility for delivering the message via the communication channel 220.

As discussed, depending upon the carrier (communications channel host) the DTA 290 may be able to ascertain a delivery status (e.g., "read," delivered, "undelivered" etc.) of a sent, i.e., forwarded, message. Upon receiving some form of a "non-delivery notification", i.e., a message delivery error, a DTA 290 may notify the MTEH module 540 of the occurrence of the message delivery error. The MTEH module 540 may have an input queue, retryQ 542, where the delivery error notifications from the DTA 290 may be placed to await processing by the MTEH module 540. From the retryQ 542, the delivery error notifications may pass to a retry process module 544 which can decide whether a retry should be attempted or not. This decision may be dictated by the messaging policies previously discussed (e.g., a message may only be attempted to be delivered five times). If delivery of the failed message is to be retried (i.e., attempted again) then a message handling request may then be placed in the coreQ 252 for processing by the Core Messaging module 250. If the delivery of the message is not to be attempted, a dead message notification can be placed into a deadQ 546 which is an input queue for a Dead Message module 548. The Dead Message module may process the dead message notification by bring the dead message status to a system administrator (e.g., place such a notification in an administrator's email box).

Message Handling Summary:

RTA 230:
  protocol handler 232 (for example, SMTP) accepts message to be processed
  check to see if UID is valid
    if it is place in message store with DAL,
    else bounce
  record an observation to trackerQ 284
  CAL creates UMF and place in coreQ 252

Core Messaging Module 250:
  User Manager module 270 grabs UMF message from coreQ 252
  gets user active profile 40
  Decision Maker module decides which communications channel 220 to use
    (external augmentation/processing can happen as special channel)
    In some embodiments, the Decision Maker module may be responsible for determining which messages are to be sent and the communication channels that are to be used.
  MM module 260 dispatches to appropriate DTA 290 by placing in dtaQ 292 for that DTA 290 (i.e., communications channel 290)
  record an observation to trackerQ 284

DTA 290:
  grabs message off of dtaQ 292
  CAL converts message and DTA 290 delivers via communications channel 220
  if unable to process puts in retryQ 542
  otherwise message was successfully sent to carrier,
  record an observation to trackerQ 284

Integration of Instant Messaging Systems

Integrating instant messaging (IM) services, such as AOL Instant Messaging, ICQ, Yahoo Messenger, Jabber, MSN Messenger and others, into the systems and methods described herein can pose particular challenges in terms of allowing for seamless communications between a user within such systems and the desired instant messaging service. These challenges are present in part due to design and implementation issues, and conflicts between existing business practices. This section of the disclosure addresses the resource management issues (e.g., screen names, network connections, etc.) and solutions that may allows for seamless communications between users of a messaging service, such as the ones described above, and available IM services.

Figure 6:
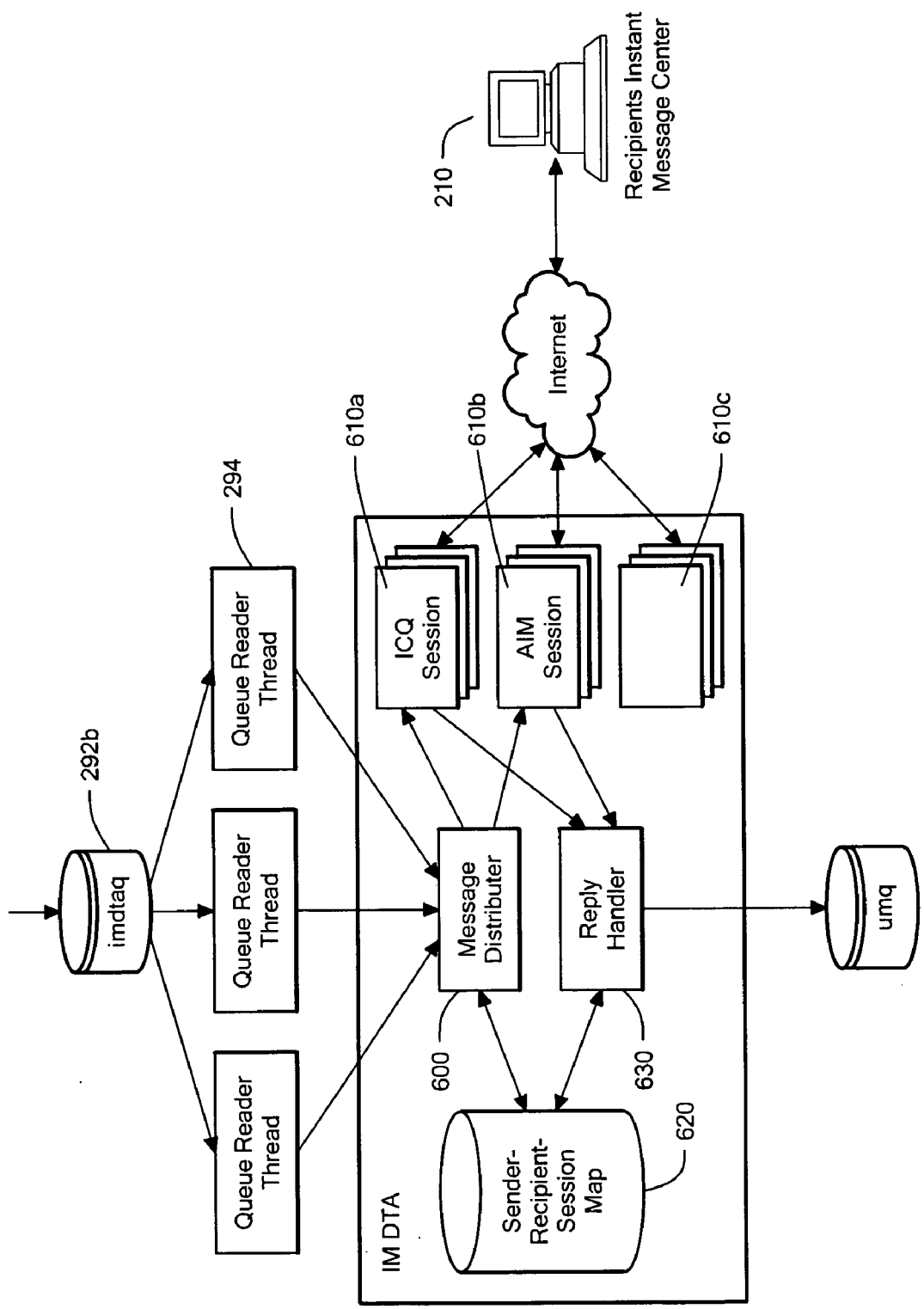
FIG. 6 illustrates one embodiment of an instant messaging delivery transport agent.

FIG. 6 illustrates one embodiment of an Instant Messaging DTA 290b that may used to facilitate and maintain an instant messaging session within a messaging system (such as the one described herein, e.g., system 200 or 500)—instant messaging service provider (e.g., AOL) environment. The IM DTA 290b may provide a single point of processing for any instant messages routed through the messaging system, provided they use a supported IM carrier. The IM DTA 290b can handle messages being sent to users in an Instant Message communications protocol (e.g., AIM, ICQ, etc). Messages from the Core Messaging module 250 (e.g., MM module 260) may be placed into the IM DTA 290b's input queue, imdtaq 292b. To reduce bottlenecks on the IM DTA 290b, the IM DTA 290b may start up several queue reading threads 294. These queue reading threads 294 may all read from the same incoming queue (i.e., imdtaq 292b). These queue reading threads 294 may then call back to the IM DTA 290b to find the appropriate virtual session object 610 for the message (being handled by the queue reading threads 294) to be sent through.

The IM DTA 290b illustrated in FIG. 6 includes a Message Distributor module 600 which can determine which virtual session object 610 to allocate for a given IM session. The virtual session object 610 can be an object that mimics an Instant Messenger client. The virtual session object 610 may maintain a session with the appropriate IM server (e.g., an AOL server) using the appropriate protocol for the particular IM server. A virtual session object 610 may utilize the carrier management module 530 to obtain generic carrier specific data, while protocol-specific information may be encapsulated in the virtual session object 610 itself Some of the information which may be required from carrier management module 530 (and carrier knowledge database 532) could include the carrier hostnames and port numbers, user Ids and passwords, and message format information, etc.

A different virtual session object 610 may have to be generated to support each IM communications protocol. For example, virtual session object 610a may handle ICQ conversations while virtual session object 610b may handle AOL IM conversations. The virtual session objects 610 may be named in such a way that the IM DTA 290b can instantiate them dynamically based on the carrier of the messages that need to be sent. Multiple Ids for each IM carrier (e.g., AOL, Yahoo, etc.) may be logged on as virtual session objects 610. The virtual session objects 610 used by the IM DTA 290b can be configured by the system administrator. That is to say, the system operator subscribes as many virtual session objects 610 as the maximum simultaneous conversation that the system users may engage in with users on each specific IM protocol service (e.g., AOL, Yahoo, etc.). So, if it is expected that the messaging system may be communicating to ten different people through the IM DTA 290b, ten virtual session objects 610 may generally be needed to accomplish this. However, if the number of virtual session objects 610 proves to be too low, the virtual session objects 610 can be cycled through.

When a message comes into a messaging system (such as system 200 or 500) and is delivered to an IM DTA 290b, the IM DTA 290b may maintain the information needed to link replies (from the message recipient) back to the sender and to route possible further messages from the sender to the recipient through the same path. This "path" information can be referred to as a "conversation." The Message Distributor module 600 may use the "From", "To" and "Carrier" information contained within a UMF message to determine whether an IM conversation has already been established between the two users (i.e., the sender and the recipient). If a conversation is underway, the Message Distributor module 600 may route the incoming messages to the virtual session object 610 that is already in use for that conversation. If no conversation is underway, the Message Distributor module 600 can perform some load balancing routines to determine which open virtual session object 610 to route the incoming message to.

The Message Distributor module 600 may determine if a conversation is underway by consulting a Message Map module 620. The Message Map module 620 may store conversation information for each Sender/Recipient/Carrier combination currently in use. The Message Map module 620 may be defined by an interface, so database and volatile-storage versions might be swapped out cleanly. The Message Map module 620 may store and maintain the following types of conversation information: Sender Identity, Recipient Identity, Timestamp of last sent Message, Timestamp of last reply, Carrier name, Virtual Session object 610 identification, etc. The maintenance of a virtual session object 610 may "time-out" if a message has not been handled within some set period of time.

If a conversation between a sender and a recipient is not currently active, i.e., no virtual session object 610 is currently allocated to this sender-recipient conversation, the Message Distributor module 600 may then allocate an available virtual session object 610 for this conversation.

For Example:

Pascal is a messaging system subscriber. He has an IM communications channel 220b established to have messages sent to his AOL screen name.

A message for Pascal comes into the messaging system from Joe.

Pascal's active profile 40 indicates that this message is to be sent to his AOL screen name.

The message is therefore delivered to the IM DTA 290b

The Message Distributor module 600 may consult with the Message Map module 620 to determine whether a virtual session object 610 currently exists for a Pascal-Joe conversation. If there isn't, the Message Distributor module 600 may assign this conversation to the first available (AOL-compliant) virtual session object 610.

The Message Distributor module 600 informs the Message Map module 620 of the Pascal-Joe conversation.

Then a message for Pascal comes in from Jane . . . same process . . . another virtual session object 610 is established (or maintained)

Then another message comes in for Pascal, this time from Jack . . . same process another virtual session object 610 is established (or maintained)

Yet another message arrives for Pascal, this time from Jennifer. However, this time there are no virtual session objects 610 that are available (all the virtual session objects 610 for communicating to Pascal via AOL have been previously allocated)

In this case, the Message Distributor module 600 may consult with the Message Map module 620 to determine which virtual session object 610 has had the least recent activity upon it. In this case, it would be virtual session object 610 that was assigned to the Pascal-Joe conversation. Thus, this virtual session object 610 could be reallocated to this new Pascal-Jennifer conversation, and the Message Map module 620 could be updated accordingly.

If Joe later tries to send another message to Pascal, the Message Distributor module 600 would then have to determine a new virtual session object 610 to host this conversation.

If the messaging system subscriber desires, they can reply to the delivered IM message using the IM service provider's native client (e.g., AOL IM windows client). This reply may be received by a virtual session object 610 (which need not be the same virtual session object 610 that was responsible for the delivery of the IM message to the subscriber). The virtual session object 610 may then pass the message (i.e., the reply) to a Reply Handler module 630. The Reply Handler module may then consult with the Message Map module 620 to determine the originating sender's name, address, etc. If the originating sender's information can be ascertained, the reply (message) may then converted into UMF and delivered to the Core Messaging module 250 for handling. For example, if the original sender is also a messaging system subscriber (in addition to the original recipient), this reply message can be processed by the messaging system in the same manner as other messages are handled. Thus, in some embodiments of the systems discussed herein, a messaging system may allow replies to be sent back to the original sender even if the original sender's communications environment has changed (from email, SMS, . . . etc.).

In other embodiments, however, the messaging system may simply forward the reply (message) via the same type of communications channel in which the original sender sent the original message. May this may particularly useful when the original sender is not a subscriber of the messaging systems described herein.

In some embodiments, a messaging system may also be able to maintain and relay "presence" service if this information is provided by the IM service provider. The virtual session objects 610 may access to protocol level information about the IM screen names which they are corresponding with. Some IM protocols, such as the one used by AOL and others, transmit information such as the availability of the person (e.g., are they idle, are they online, is there a so-called "away" message, are they in "do not disturb" mode). The availability of this "presence" information from an IM provider may allow for the virtual session object 610 to update the status of a conversation by forwarding this presence information to the Message Map module 620, either directly or via the Message Distributor module 620.

Figure 7:
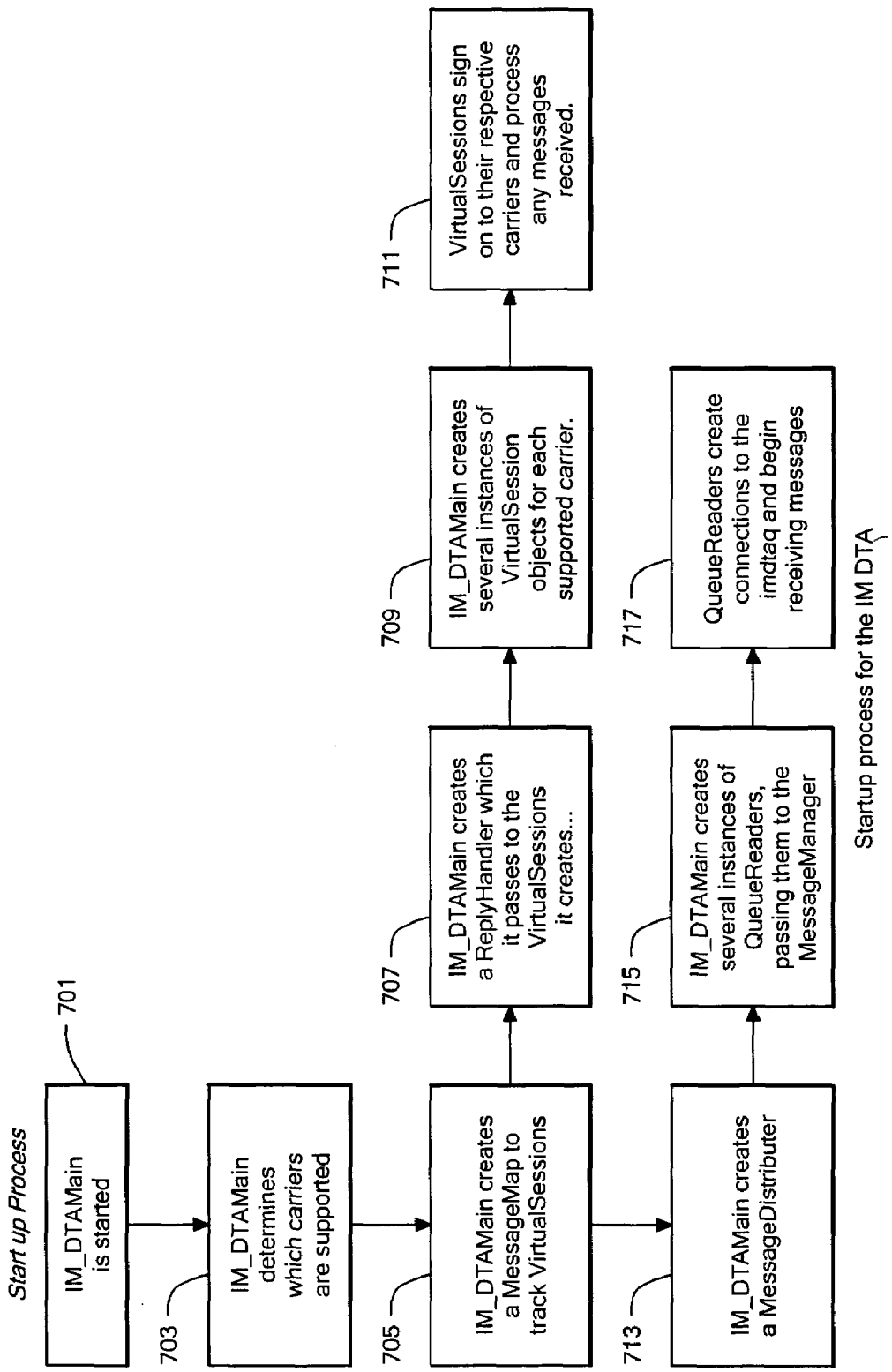
FIG. 7 depicts one method of a startup process for an instant messaging delivery transport agent.
Figure 8:
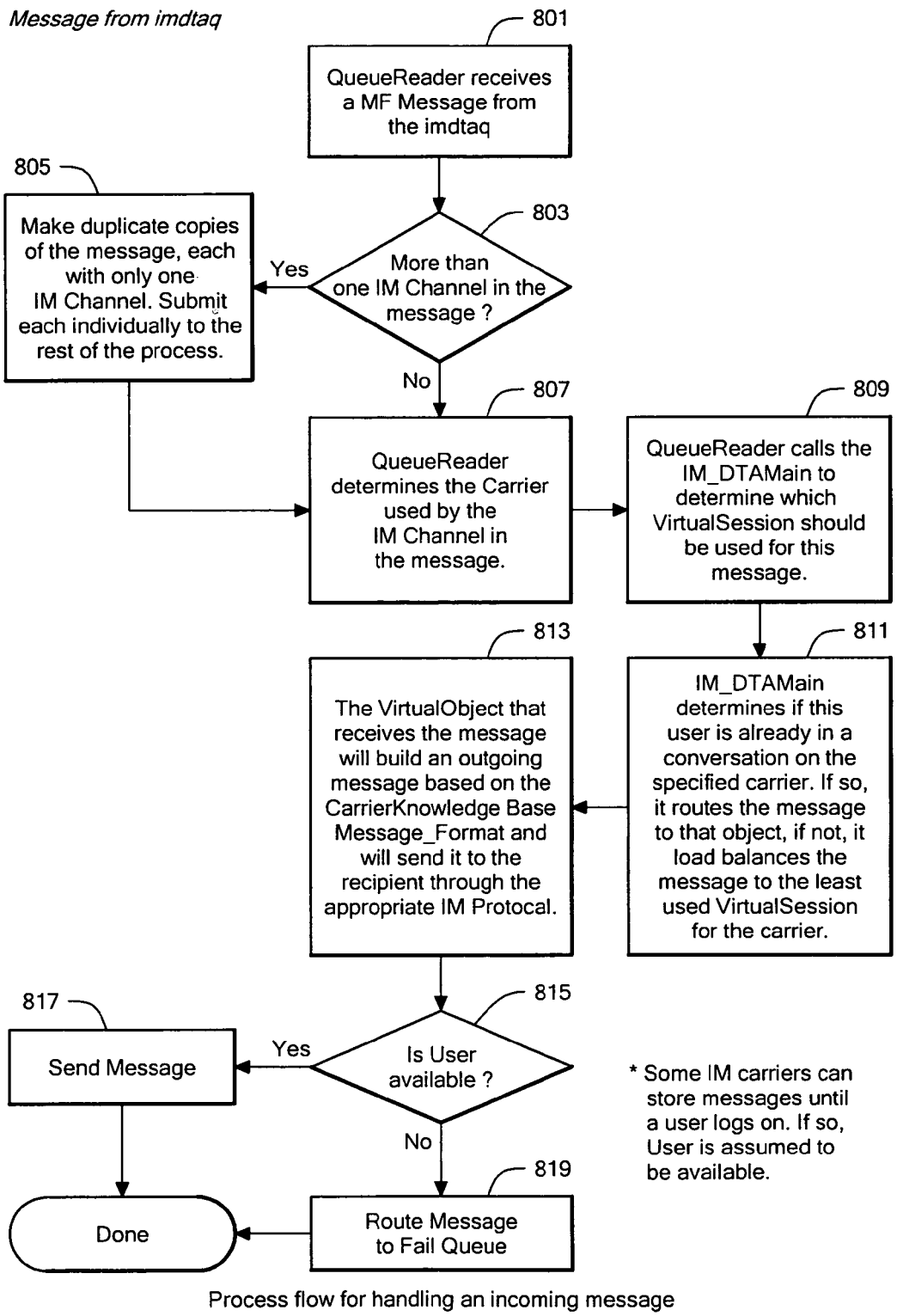
FIG. 8 depicts one method of a message process flow for an instant messaging delivery transport agent.
Figure 9:
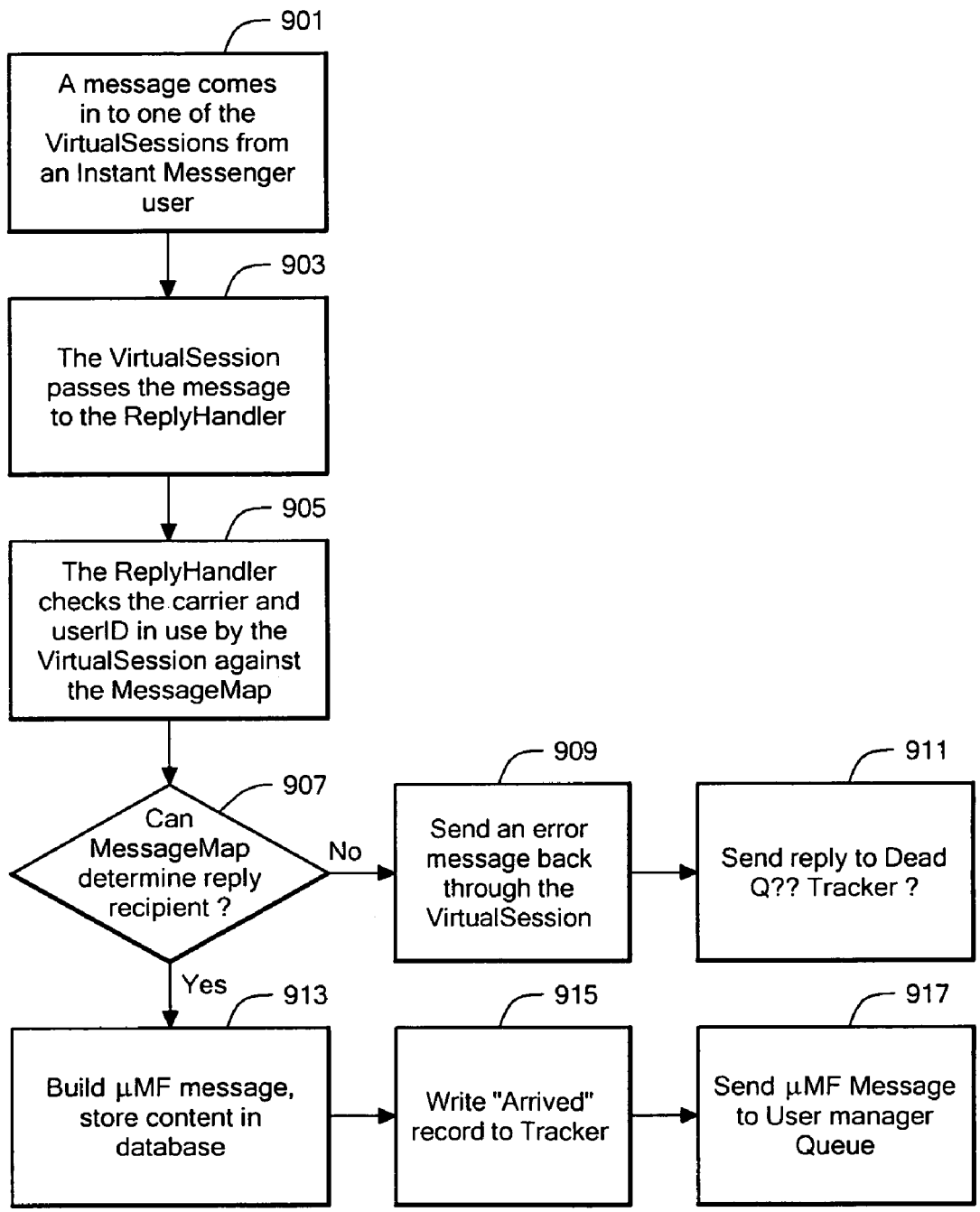
FIG. 9 depicts another method of a message process flow for an instant messaging delivery transport agent.

The message handling and operation of the IM DTA 290b will now be further described by referring to FIGS. 7-9.

FIG. 7 depicts one method of a startup process for an IM DTA 290b may undergo. The IM DTA 290b is started in step 701. Then, step 703, the IM DTA 290b determines which IM carriers are supported by the IM DTA 290b. Then, step 705, the IM DTA 290b may create a Message Map module 620 to track the virtual session objects 610 which will be handled by the IM DTA 290b. The IM DTA 290b may then create a Reply Handler module 630, step 707, which the IM DTA 290b will pass to the virtual session objects 610 which it creates. In step 709, the IM DTA 290b may create the virtual session objects 610 for each of the carriers which are supported. Then the virtual session objects 610 may sign on to their respective carrier so that they will be able to process any messages which they receive, step 711. The IM DTA 290b will allow create the Message Distributor module 600, step 713. Then the IM DTA 290b may create several queue reading threads 294 which the IM DTA 290b passes to the Message Distributor module 600, step 715. Lastly, step 717, the queue reading threads 294 can create connections to the imdtaq 292b and begin receiving messages.

FIG. 8 depicts one method of a message process flow for an IM DTA 290b. In step 801, a queue reading thread 294 receives a UMF message from the imdtaq 292b. Step 803, the queue reading thread 294 determines whether more than one IM communications channel 220b is identified in the message. If not, the message is moved to step 807. If there is, the queue reading thread 294 makes duplicate copies of the message, step 805, so that each copy only identifies one IM communications channel 220b. Each copy is then moved to step 807. In step 807 the queue reading thread 294 determines the IM carrier used by the IM communications channel 220b identified in the message. In step 809, the queue reading thread 294 calls the IM DTA 290b to determine which virtual session object 610 should be used to handle this message. The IM DTA 290b may then determine if this user is already in a conversation on the specific carrier (and possibly with same sender). If so, the IM DTA 290b routes the message to that virtual session object 610. If not, the IM DTA 290b may load balance the message to the least used virtual session object 610 for that IM carrier. In step 813 the virtual session object 610 that receives the message will build (i.e., convert) an outgoing message based on the carrier information (obtainable via the carrier management module 530/carrier knowledge database 532) and then forward the message to the recipient via the communication channel 220b (for that carrier). In step 815, the virtual session object 610 may "listen" to see if the recipient is available (currently able to receive an IM message via the communications channel 220b), if this type of delivery confirmation information is available through that IM carrier. If the virtual session object 610 receives a delivery confirmation, then the message is considered to be sent, step 817. If not delivery confirmation is received (when one would be expected from that IM carrier) the message may be move to Failed queue, step 819, which it may undergo further processing by the messaging system.

FIG. 9 depicts one method for handling a reply message through a IM DTA 290b. In step 901, a virtual session object 610 receives a reply message from an IM user. In step 903 the virtual session object 610 passes the message to the Reply Handler module 630. The Reply Handler module 630 checks the carrier and userID in use by the virtual session object 610 against the information maintained in the Message Map module 620, step 905. Step 907 asks: can the Message Map module 620 determine who is the recipient of the reply? If the Message Map module 620 can not, an error message may be transmitted through the virtual session module 610 to the reply sender (which may be initiated via the Message Distributor module 600), step 909. Additionally, in step 911, the reply message may be placed in a dead queue. If the Message Map module 620 can determine the reply recipient, the IM DTA 290b may build a UMF message and may deliver the UMF message to a database (e.g., database 240), step 913. Additionally, the IM DTA 290b may send tracking information to the MT module 280, step 915. Finally, step 917, the UMF message may be sent to the Core Messaging module 250 (e.g., to the UM Module 270).

Interfaces

Multiple user interfaces having controls may be present for allowing a user to remotely manage their accounts (e.g., provide information and verify the status of a "delivered" message, etc) through a number of devices, as well as an API for letting third parties develop their own user interfaces. Each interface may have a different set of features: creating, editing, setting . . . depending on the opportunities presented by the communications device. For example, a plain telephone without a sophisticated interactive voice system (i.e., the keypads are the controls), might only be able to set the user's active profile 40. Other user interfaces that may used to access a messaging system (e.g., system 200 or 500) may include telephones systems with interactive voice systems and/or interactive voice recognition systems, and computers having a web browser client, etc.

For example, a user's current profile 40 may be set manually by the user (via a user interface), or alternatively, automatically by consulting the profile and location database 274 and/or the user preferences database 276 as discussed above. Manually, for example, the user may activate a "Do Not Disturb" profile 40 set, which may limits the messages the user may receive while this profile is active. If the salient features of the message match the criteria in the user's user preferences information, the message may then be immediately to the user, otherwise the message may either be put on hold or sent to a message archive.

Referring back to FIG. 3, system 200 includes a message storage database 240 that may include copies of received messages, uniform media formatted messages and messages formatted in communications protocols. In some embodiments, by utilizing a user interface 302 having controls (e.g., keypads, push buttons, active touch screens, voice recognition systems etc.) a user may be able access the message storage database 240 and view those messages which the user may be authorized to view. Using the user interface 302, thus, a user could obtain those message which may have come into the system 200 during the user's "do not disturb" profile 40 (e.g., when the "do not disturb" profile 40 is still active). The user interface 302 may interface with the message storage database via an IMAP or POP3 client, for example.

Similarly, the system 200 may also include an application program interface gateway (not shown) for accessing the message storage database 240. An application may interface, via the application program interface gateway, with the message storage database 240 assuming that the application's communication with the system 200 (e.g., the message storage database 240) adheres to a protocol of the system's 200 API (which may be generally provided to third-party developers).

In additional to the messages storage database 240, interfaces may also be provided to allow users or applications to access the contact profile and location database 274 and/or the user preferences database 276. System 200 includes a user interface 304 having controls that can be utilized by a user (i.e., a subscriber) to access the contact profile and location database 274 and/or user preferences database 276. Using the user interface 304 a user thus can update any of the information that is stored in these database, e.g., change the active profile 40 settings, communications devices 220 information, location information, preferences information, etc. In other words, the user may effectively manage his or her messaging account through the user interface 304.

The system 200 may also include an application program interface gateway 306 to permit applications to access the contact profile and location database 274 and/or user preferences database 276. Thus, the management (e.g., updating) of these databases may be accomplished by an application which is external to the system 200 (in much the same way as this information may be entered "manually" via the user interface 304).

In additional to the interfaces discussed above, in some embodiments a messaging system may also include interfaces that allow users or external applications to access a message tracking database. For example, system 200 includes a user interface 308 having controls that can be utilized to access the message tracker database 282. Thus, a user (e.g., subscriber) could access the message tracker database 282 via the user interface 308 to verify the status of a message (e.g., see whether a message is still within the system 200 or has been delivered via a communications channel 220 etc). Similarly, the system 200 may also include an application program interface gateway 310 to permit applications to access the message tracker database 282. Thus, an external application could ascertain the status of a message by accessing the message tracking database 282 through the application program interface gateway 310.

API Gateways:

The API gateways discussed herein may run on the http protocol and may accept messages (i.e., inputs) which are presented in a XML format.

System administrators may offer an API to third-party developers so they may be able to create their own RTAs (e.g., Sender API RTA 230*f*) or other applications which may interface with the various components of the messaging system as discussed above. The API gateways may allow a messaging system (e.g., system 200 or 500) to establish the credentials of a third-party application. The step of authorization (i.e., establishing the credentials) may be accomplished by an Authentication Manager (AM) module. The AM module can provide a means for authenticating an application's interaction with an API Gateway(s) and/or Sender API RTA. Different levels of access to the messaging system may be enabled to allow for selective provisioning for different customers. For example, the credentials may allow the third-party application to specify which communications channels 220 to deliver a message without employing the UM module 270 to do its lookups. External applications may access the API by passing a credential, via an API gateway, to the AM module. This credential may be matched to a record specific to that messaging system to authenticate the external application and to provide it appropriate access to the messaging system. If application credentials are validated, then the XML command (i.e., the input) may be processed, otherwise the command may be rejected The API, accessible via an API gateway, may give the developer access to a message during the message handling:

Message Tracking—once a message is accepted by the messaging system, a reference identification for the message can be returned.

Security Consideration—since the UM module 270 may have access to the currently available devices the API allows developers access to what security protocols are available, and if possible encryption keys to use.

Multi-Media Considerations—the API reveals the various media types (text, voice, imaging) available to the user on their communications devices 220. This allows for the developer the opportunity to render a version of the message that is specifically tailored to the communications device 220. For example, if the user has a text-only communications device 220 that permits no formatting capability and is limited to 120characters, the developer can generate a version that has the critical information in a 120characters package and send a high resolution version to a message archive (e.g., a message storage database 240) for later consultation.

The presence of an API (and appropriate API gateways) may give developers the ability to integrate the messaging systems discussed herein easily into other applications. Using the API, an application can issue commands to send and track messages as well as create, modify and delete subscriber accounts.

Such commands could be, for example:
create, view, modify, and delete user accounts
create, view, modify, and delete communication channels 220 and the profiles 40 that control message paths
link communication channels 220 with user profiles 40
activate a subscriber profile 40
send and track messages to subscribers and non-subscribers The API, accessed via an API gateway, can provide a simple and lightweight mechanism for using XML to exchange structured information between an external application client and the messaging system (e.g., system 200 or 500). The API may be engineered for simplicity, extensibility, and rapid message transfer. The protocol model may be based on a single round trip interaction: the client makes a request of the messaging system and the messaging system responds. By using a compound data structure specified in XML, the programmer can simplify the application such that minimal state information needs to be maintained between API transactions. This single interaction can be extended to multiple interactions if needed. For security measures, the interface can use any combination of SSL (for data encryption), a non-standard port and/or HTTP basic authentication. In addition, the Authentication Manager component can validate whether the application is allowed access to the messaging system, as well as which commands the application may be permitted to execute.

Depending on the installation, one or more of the following types of API Gateways may be available for use with an external application:

HTTP Gateway: this version of the Gateway enables the application to use HTTP commands, such as Post and Get, to communicate with the messaging system. This is particularly suited to an application that needs to communicate with a messaging system across the Internet.

JMS Gateway: this version of the Gateway may enable the application to directly queue its requests on a messaging system input queue using JMS (Java Messaging Service) commands. This is useful when the application is co-located with the messaging system (e.g., network server(s) hosting the messaging system), and may help avoid the communication overhead of HTTP.

In order to achieve the goals of scalability, and high availability, the modules discussed herein (which can be comprised of computer software programs) may be developed in a modular fashion such that the system components may run across multiple hardware platforms. In a distributed system, one copy of each module may run on each processor in a server farm. Each such module may be capable of starting up additional copies of itself on that processor in order to achieve higher throughput for the functionality provided by that module. However, one copy of the module may serve as the manager of the other similar modules, ensuring that a sufficient number of such modules are executing based on the amount of work to be done and the available processor and other capacity on that system.

The messaging system may depend on a cross-platform messaging and queuing system. The modules may work with each other through a set of named queues. When ready, the first module (or thread) may pick up the first job in the queue. After finishing all it's processing, the module (or thread) may then add the job at the end of the next queue.

The messaging system may also depend on access to a highly scalable, redundant, distributed relational database system for the storage of key information. Thus, while information may be moved between processes on the same system using different data structures, information that needs to be persistent may be saved in the relational database system as needed, or at least periodically. This persistent storage may assist in a message recovery in case of any system component failure, whereby incomplete processing of any messages may be resumed from the last saved persistent state.

The Modules (e.g., software) may normally run in a hosted environment with fast Internet access. In order to achieve the performance goals the modules may operate on appropriately configured Sun system under the Solaris environment. It is possible that other operating environments may be used or deployed where appropriate or where necessary to support specific communications technologies.

The modules may be developed using Java to leverage the wide variety of tools and services available, and to enable cross-platform deployment.

Interaction with external systems may be conducted using open standards as far as possible. Thus, SMTP, with its various extensions, may be used for email in and out of the messaging system. Similarly, other Internet protocols and standards such as HTML, HDML, WML, HTTP, HTTPS, and WAP etc. may be deployed for most messaging and user interaction.

Message representation in Uniform Media Format may be stored in the form of XML. Similarly, any new or third party Receiving Transport Agents and Delivery Transport Agents may be developed with the expectation that the data transfer will be in XML format.

Exchange of information with external calendar and address book systems may also be based on XML representations of VCard and iCal standards.

The present disclosure discusses various embodiments of messaging systems and methods that can be used to route a message to a communications device. Various modifications and improvements thereon will, however, become readily apparent to those skilled in the art. The descriptions of the messaging systems and methods for routing a message to a communications device should therefore be considered only as illustrative, and not as limiting, of the present disclosure. The spirit and scope of the present disclosure is to be limited only by the following claims.

What is claimed is:

1. A method for routing a message to a communications device, said method comprising:
   receiving a message via a communications channel;
   converting said message into a uniform media format;
   identifying at least one of the following: at least one user communications device to receive said message and at least one communications channel for delivering said message, and wherein said identifying further comprises accessing a first database containing contact profile and location information and accessing a second database containing user preferences information;
   converting said uniform media formatted message for at least one communications protocol;
   forwarding said message formatted for said at least one communications protocol to said at least one user communications device via at least one communications channel;

maintaining a copy of said uniform media formatted message within a database;

determining whether said message formatted for a first communications protocol has been delivered via a first communications channel;

retrieving said copy of said uniform media formatted message from said database;

identifying at least one of the following: a second communications device to receive said message and a second communications channel for delivering said message;

converting said uniform media formatted message for a second communications protocol; and forwarding said message formatted for said second communications protocol via said second communications channel.

2. A method in accordance with claim 1, wherein said uniform media format is implemented in the extensible markup language.

3. A method in accordance with claim 1, wherein said at least one communications protocol includes at least one of the following: SMTP, SNPP, SMPP, SIP, SIMPLE, SMDI, Instant Messaging, Short Messaging Service and a Sender Application Program Interface.

4. A method in accordance with claim 1, wherein the step of identifying includes:

receiving information from an application via an application program interface gateway.

5. A method in accordance with claim 1, further comprising:

receiving at least one of the following through a user interface: said contact profile and location information and said user preferences information.

6. A method in accordance with claim 1, further comprising:

receiving at least one of the following from an application through an application program interface gateway: said contact profile and location information and said user preferences information.

7. A method in accordance with claim 1, further comprising:

storing in a database a copy of at least one of the following: said received message, said uniform media formatted message and said message formatted for said at least one communications protocol.

8. A method in accordance with claim 7, further comprising:

permitting accessing of said database through a user interface.

9. A method in accordance with claim 1, further comprising:

monitoring delivery status information of said message forwarded to said at least one identified communications device.

10. A method in accordance with claim 9, further comprising:

storing said delivery status information in a database.

11. A method in accordance with claim 10, further comprising:

permitting accessing of said database through a user interface.

12. A method in accordance with claim 10, further comprising:

permitting accessing of said database through an application program interface gateway.

13. A method in accordance with claim 1, wherein:

a first communications channel and a second communications channel are identified, said uniform media formatted message is converted for a first communications protocol corresponding to said first communications channel and also is converted for a second communications protocol corresponding to said second communications channel, and wherein said message formatted for said first communications protocol is forwarded via said first communications channel and said message formatted for said second communications protocol is forwarded via said second communications channel.

14. A method in accordance with claim 1, further comprising:

maintaining a virtual session between a sender and a recipient, wherein said uniform media formatted message is converted for an instant messaging communications protocol and wherein said converted message is forwarded to said recipient via an instant messaging communications channel.

15. A method in accordance with claim 1, wherein said step of receiving includes directing said message to a receiving transport agent and wherein said receiving transport agent converts said message into a uniform media format.

16. A method in accordance with claim 15, further comprising:

delivering said message converted into a uniform media format to a core messaging module, wherein said core messaging module identifies said at least one user communications device to receive said message.

17. A method in accordance with claim 16, wherein said core messaging module comprises a user manager module and a message manager module and wherein said message manager module consults with said user manager module to identify at least one of the following: said at least one user communications device to receive said message and said at least one communications channel for delivering said message, and wherein said message manager module delivers said uniform media formatted message to at least one delivery transport agent.

18. A method in accordance with claim 17, wherein said at least one delivery transport agent converts said uniform media formatted message into a communications protocol and forwards said message formatted in said communications protocol to said identified at least one user communications device.

19. A method in accordance with claim 1, wherein said message is received at a receiving transport agent and wherein said receiving transport agent directs the conversion of said message into a uniform media format and directs the storage of said uniform media formatted message into a message storage database.

20. A method in accordance with claim 19, further comprising:

delivering a message handling request to a core messaging module wherein said message handling request corresponds to said received message and wherein said core messaging module identifies said at least one user communications device to receive said message.

21. A method in accordance with claim 20, wherein said core messaging module comprises a user manager module and a message manager module and wherein said message manager module consults with said user manager module to identify at least one of the following: said at least one user communications device to receive said message and said at least one communications channel for delivering said message, and wherein said message manager module delivers at least one message delivery request to at least one delivery transport agent.

22. A method in accordance with claim 21, wherein said at least one delivery transport agent directs the retrieval of said uniform media formatted message from said message storage database and directs the conversions of said uniform media formatted message into a communications protocol and forwards said message formatted in said communications protocol to said identified at least one user communications device.

23. A method in accordance with claim 22, wherein at least one of the following is placed in a queue as determined by a load balancing module: said message handling request and said at least one message delivery request.

24. The method of claim 1 further comprising correlating schedule preferences within said contact profile and location information with a present time and date associated with a clock and calendar module.

25. The method of claim 1 wherein converting said message into a uniform media format comprises:
converting said message into a uniform media format, wherein a uniform media format is a data structure that preserves features from a source protocol and extracts salient features that may be used for analyzing the message.

26. A system for routing a message to a communications device, said system comprising:
at least one receiving transport agent to receive a message via a communications channel, wherein said at least one receiving transport agent converts said message into a uniform media format;
at least one core messaging module wherein said at least one core messaging module identifies at least one of the following:
at least one user communications device to receive said message and at least one communications channel for delivering said message; and at least one delivery transport agent to convert said uniform media formatted message for at least one communications protocol and forward said message formatted for said at least one communications protocol to said at least one user communications device via at least one communications channel;
wherein said at least one core messaging module comprises:
a user manager module; and
a message manager module, wherein said message manager consults with said user manager module to identify said at least one of the following: said at least user communications device to receive said message and at least one communications channel for delivering said message; and
a contact profile and location database containing contact profile and location information, wherein said user manager module can access said contact profile and location information stored in said contact profile and location database;
and wherein the system further comprises:
a message transmission error handling module to handle message delivery errors, wherein said at least one delivery transport agent notifies said message transmission error handling module of the occurrence of a message delivery error.

27. A system in accordance with claim 26, wherein said at least one receiving transport agent, said at least one core messaging module and said at least one delivery transport agent reside on a network server.

28. A system in accordance with claim 26, wherein said at least one receiving transport agent and said at least one core messaging module and said at least one delivery transport agent reside on a plurality of network servers.

29. A system in accordance with claim 26, wherein said at least one communications channel includes at least one of the following: an email communications channel, a web browser communications channel, a wireless application protocol communications channel, an instant messaging communications channel, a short messaging service protocol communications channel, a fax communications channel, a session initiation protocol communications channel, a paging service communications channel and a receiver application program interface communications channel.

30. A system in accordance with claim 26, wherein said at least one receiving transport agent includes at least one of the following: an email receiving transport agent, an HTML receiving transport agent, a HDML receiving transport agent, a WML receiving transport agent, a page receiving transport agent, a fax receiving transport agent, an Instant Messaging receiving transport agent, a Short Messaging Service receiving transport agent, a Session Initiation Protocol receiving transport agent and a Sender Application Program Interface receiving transport agent.

31. A system in accordance with claim 26, wherein said at least one delivery transport agent includes at least one of the following: an email delivery transport agent, an HTML delivery transport agent, a HDML delivery transport agent, a WML delivery transport agent, and Instant Messaging delivery transport agent, a Short Messaging Service delivery transport agent, a Session Initiation Protocol delivery transport agent, a Simplified Message Desk Interface delivery transport agent, a page delivery transport agent, a fax delivery transport agent and a Receiving Application Program Interface delivery transport agent.

32. A system in accordance with claim 26, further comprising:
a load balancing module, wherein said load balancing module controls message handling within said system.

33. A system in accordance with claim 26, wherein:
said at least one receiving transport agent includes an inbound message queue wherein messages received at said at least one receiving transport agent can be placed in said inbound message queue;
said at least one core messaging module includes a core messaging queue wherein message handling requests received from said at least one receiving transport agent can be placed in said core messaging queue; and
said at least one delivery transport agent includes a delivery messaging queue wherein message delivery requests received from said at least one core messaging module can be placed in said delivery messaging queue.

34. A system in accordance with claim 26, wherein said at least one delivery transport agent includes a carrier management module.

35. A system in accordance with claim 34, further comprising a carrier knowledge database containing carrier information wherein a carrier management module can access said carrier information stored in said carrier knowledge database.

36. A system in accordance with claim 34, wherein said carrier management module includes a carrier management queue wherein carrier management requests generated by said at least one delivery transport agent can be placed in said carrier management queue.

37. A system in accordance with claim 26, further comprising:
a message storage database to store at least one of the following: said received message, said uniform media formatted message and said message formatted in said at least one communications protocol.

38. A system in accordance with claim 37, further comprising:
a user interface comprising controls, wherein said user interface can be utilized to access said message storage database.

39. A system in accordance with claim 37, further comprising:
an application program interface gateway, wherein an application can interface with said application program interface gateway to access said message storage database.

40. A system in accordance with claim 26, wherein said message transmission error handling module includes an input queue wherein delivery error notifications can be placed.

41. A system in accordance with claim 26, further comprising:
a user interface comprising controls, wherein said user interface can be utilized to access said contact profile and location database.

42. A system in accordance with claim 26, further comprising:
an application program interface gateway, wherein an application can interface with said application program interface gateway to access said contact profile and location database.

43. A system in accordance with claim 26, further comprising:
a user preferences database containing user preferences information, wherein said user manager module can access said user preferences information stored in said user preferences database.

44. A system in accordance with claim 43, further comprising:
user interface comprising controls, wherein said user interface can be utilized to access at least one of the following: said contact profile and location database and said user preferences database.

45. A system in accordance with claim 43, further comprising:
an application program interface gateway, wherein an application can interface with said application program interface gateway to access at least one of the following: said contact profile and location database and said user preferences database.

46. A system in accordance with claim 45, further comprising an authentication module.

47. A system in accordance with claim 26, further comprising:
a message tracker module having a message tracker database, wherein at least one of the following reports message tracking information to said message tracker module: said at least one receiving transport agent, said at least one core messaging module and said at least one delivery transport agent,
and wherein said message tracker module maintains said message tracking information in said message tracker database.

48. A system in accordance with claim 47, further comprising:
a recovery agent module, wherein said recovery agent module monitors said message tracking information to detect message delivery errors and wherein said recovery agent module notifies said core messaging module of said message delivery errors.

49. A system in accordance with claim 47, wherein said message tracker module includes an input queue and wherein said message tracking information can be placed in said input queue.

50. A system in accordance with claim 47, further comprising:
a user interface comprising controls, wherein said user interface can be utilized to access said message tracker database.

51. A system in accordance with claim 47, further comprising:
an application program interface gateway, wherein an application can interface with said application program interface gateway to access said message tracker database.

52. A system in accordance with claim 26, further comprising:
a message storage database to store at least one of the following: said received message, said uniform media formatted message and said message formatted in said at least one communications protocol;
a message tracker module having a message tracker database, wherein the following report message tracking information to said message tracker module: said at least one receiving transport agent, said at least one core messaging module and said at least one delivery transport agent, and wherein said message tracker module maintains said message tracking information in said message tracker database; and
a recovery agent module, wherein said recovery agent module monitors said message tracking information to detect message delivery errors.

53. A system in accordance with claim 26, wherein said at least one delivery transport agent includes an instant messaging delivery transport agent and wherein said instant messaging delivery transport agent comprises a virtual session object to establish an instant messaging session between a sender and a recipient.

54. A system in accordance with claim 53, wherein said instant messaging delivery transport agent further comprises a message distributor module and a message map module.

55. A system in accordance with claim 54, wherein said instant messaging delivery transport agent further comprises a reply handler module.

56. A system in accordance with claim 53, further comprising a carrier management module.

57. A system in accordance with claim 56, further comprising a carrier knowledge database containing carrier information wherein said carrier management module can access said carrier information stored in said carrier knowledge database.

58. The system of claim 26 further comprising a clock and calendar module for correlating a present time and date with schedule preferences of said contact and profile location information.

59. The system of claim 26 further wherein the at least one receiving transport agent comprises:
at least one receiving transport agent to receive a message via a communications channel, wherein said at least one receiving transport agent converts said message into a uniform media format, wherein a uniform media format is a data structure that preserves features from a source protocol and extracts salient features that may be used for analyzing the message.

60. A computer-readable storage medium containing computer executable code for instructing a computer to operate as follows:
receive a message via a communications channel;
convert said message into a uniform media format;
identify at least one of the following: at least one user communications device to receive said message and at least one communications channel for delivering said message,
access a first database containing contact profile and location information;
access a second database containing user preferences information;
convert said uniform media formatted message for at least one communications protocol;
forward said message formatted for said at least one communications protocol to said at least one user communications device via at least one communications channel;
maintain a copy of said uniform media formatted message within a database;
determine whether said message formatted for a first communications protocol has been delivered via a first communications channel;
retrieve said copy of said uniform media formatted message from said database;
identify at least one of the following: a second communications device to receive said message and a second communications channel for delivering said message;
convert said uniform media formatted message for a second communications protocol; and
forward said message formatted for said second communications protocol via said second communications channel.

61. A computer-readable storage medium in accordance with claim 60, wherein said uniform media format is implemented in the extensible markup language.

62. A computer-readable storage medium in accordance with claim 60, wherein said at least one communications protocol includes at least one of the following: SMTP, SNPP, SMPP, SIP, SIMPLE, SMDI, Instant Messaging, Short Messaging Service and a Sender Application Program Interface.

63. A computer-readable storage medium in accordance with claim 60, wherein the step of identifying includes computer executable code for instructing a computer to operate as follows:
receive information from an application via an application program interface gateway.

64. A computer-readable storage medium in accordance with claim 60, further comprising computer executable code for instructing a computer to operate as follows:
receive at least one of the following through a user interface: said contact profile and location information and said user preferences information.

65. A computer-readable storage medium in accordance with claim 60, further comprising computer executable code for instructing a computer to operate as follows:
receive at least one of the following from an application through an application program interface gateway: said contact profile and location information and said user preferences information.

66. A computer-readable storage medium in accordance with claim 60, further comprising computer executable code for instructing a computer to operate as follows:
store in a database a copy of at least one of the following: said received message, said uniform media formatted message and said message formatted for said at least one communications protocol.

67. A computer-readable storage medium in accordance with claim 66, further comprising computer executable code for instructing a computer to operate as follows:
permit accessing of said database through a user interface.

68. A computer-readable storage medium in accordance with claim 60, further comprising computer executable code for instructing a computer to operate as follows:
monitor delivery status information of said message forwarded to said at least one identified communications device.

69. A computer-readable storage medium in accordance with claim 68, further comprising computer executable code for instructing a computer to operate as follows:
store said delivery status information in a database.

70. A computer-readable storage medium in accordance with claim 69, further comprising computer executable code for instructing a computer to operate as follows:
permit accessing of said database through a user interface.

71. A computer-readable storage medium in accordance with claim 69, further comprising computer executable code for instructing a computer to operate as follows:
permit accessing of said database through an application program interface gateway.

72. A computer-readable storage medium in accordance with claim 60, further comprising computer executable code for instructing a computer to operate as follows:
maintain a virtual session between a sender and a recipient,
wherein said uniform media formatted message is converted for an instant messaging communications protocol and wherein said converted message is forwarded to said recipient via an instant messaging communications channel.

73. A computer-readable storage medium in accordance with claim 60, wherein the step of receiving includes computer executable code for instructing a computer to operate as follows:
direct said message to a receiving transport agent and wherein said receiving transport agent converts said message into a uniform media format.

74. A computer-readable storage medium in accordance with claim 73, further comprising computer executable code for instructing a computer to operate as follows:
deliver said message converted into a uniform media format to a core messaging module, wherein said core messaging module identifies said at least one user communications device to receive said message.

75. A computer-readable storage medium in accordance with claim 74, wherein said core messaging module comprises a user manager module and a message manager module and wherein said message manager module consults with said user manager module to identify at least one of the following: said at least one user communications device to receive said message and said at least one communications channel for delivering said message, and wherein said message manager module delivers said uniform media formatted message to at least one delivery transport agent.

76. A computer-readable storage medium in accordance with claim 75, wherein said at least one delivery transport agent converts said uniform media formatted message into a communications protocol and forwards said message formatted in said communications protocol to said identified at least one user communications device.

77. A computer-readable storage medium in accordance with claim 60, wherein said message is received at a receiving transport agent and wherein said receiving transport agent directs the conversion of said message into a uniform media format and directs the storage of said uniform media formatted message into a message storage database.

78. A computer-readable storage medium in accordance with claim 77, further comprising computer executable code for instructing a computer to operate as follows:
  deliver a message handling request to a core messaging module wherein said message handling request corresponds to said received message and wherein said core messaging module identifies said at least one user communications device to receive said message.

79. A computer-readable storage medium in accordance with claim 78, wherein said core messaging module comprises a user manager module and a message manager module and wherein said message manager module consults with said user manager module to identify at least one of the following: said at least one user communications device to receive said message and said at least one communications channel for delivering said message, and wherein said message manager module delivers at least one message delivery request to at least one delivery transport agent.

80. A computer-readable storage medium in accordance with claim 79, wherein said at least one delivery transport agent directs the retrieval of said uniform media formatted message from said message storage database and directs the conversions of said uniform media formatted message into a communications protocol and forwards said message formatted in said communications protocol to said identified at least one user communications device.

81. A computer-readable storage medium in accordance with claim 79, wherein at least one of the following is placed in a queue as determined by a load balancing module: said message handling request and said at least one message delivery request.

82. The computer readable storage medium of claim 60 further comprising instructions for correlating schedule preferences within said contact profile and location information with a present time and date associated with a clock and calendar module.

83. The computer readable storage medium of claim 60 wherein a uniform media format is a data structure that preserves features from a source protocol and extracts salient features that may be used for analyzing the message.

* * * * *